(12) United States Patent
Hung et al.

(10) Patent No.: US 8,807,846 B2
(45) Date of Patent: Aug. 19, 2014

(54) PLUGGABLE OPTICAL TRANSCEIVER

(71) Applicant: SAE Magnetics (H.K.) Ltd., Hong Kong (HK)

(72) Inventors: Vincent Wai Hung, Hong Kong (HK); Francis Guillen Gamboa, Hong Kong (HK); Amanda Tin Hoi Siu, Hong Kong (HK); Dennis Tak Kit Tong, Hong Kong (HK)

(73) Assignee: SAE Magnetics (H.K.) Ltd., Hong Kong (HK)

( * ) Notice: Subject to any disclaimer, the term of this patent is extended or adjusted under 35 U.S.C. 154(b) by 62 days.

(21) Appl. No.: 13/775,275

(22) Filed: Feb. 25, 2013

(65) Prior Publication Data
US 2013/0230278 A1   Sep. 5, 2013

Related U.S. Application Data

(60) Provisional application No. 61/605,775, filed on Mar. 2, 2012.

(51) Int. Cl.
| G02B 6/36 | (2006.01) |
| G02B 6/12 | (2006.01) |
| G02B 6/43 | (2006.01) |
| G02B 6/42 | (2006.01) |

(52) U.S. Cl.
CPC .. G02B 6/12 (2013.01); G02B 6/43 (2013.01); G02B 6/4214 (2013.01); G02B 6/4201 (2013.01)

USPC ............................. 385/92; 385/14; 385/88

(58) Field of Classification Search
CPC ...... G02B 6/4201; G02B 6/4214; G02B 6/43; H04B 10/40
USPC ............................................. 385/88–94
See application file for complete search history.

(56) References Cited

U.S. PATENT DOCUMENTS

| 7,581,891 | B2 * | 9/2009 | Wang ............................... 385/89 |
| 8,265,487 | B2 * | 9/2012 | Schunk .......................... 398/139 |
| 8,550,724 | B2 * | 10/2013 | Oki ................................. 385/92 |
| 2002/0018625 | A1 * | 2/2002 | Grann et al. .................... 385/88 |
| 2005/0047726 | A1 * | 3/2005 | Hodgson ......................... 385/79 |
| 2007/0110374 | A1 * | 5/2007 | Oki et al. ........................ 385/89 |
| 2007/0133930 | A1 * | 6/2007 | Ishikawa ......................... 385/92 |
| 2011/0164883 | A1 * | 7/2011 | Hudgins et al. ............... 398/141 |

* cited by examiner

Primary Examiner — Ellen Kim

(57) ABSTRACT

A pluggable optical transceiver includes: a top housing; a bottom housing; and an optical-electrical assembly enclosed by the top housing and the bottom housing. The optical-electrical assembly includes a substrate; at least a transmitting optoelectronic component disposed on the substrate; at least a receiving optoelectronic component disposed on the substrate; interface integrated circuits disposed on the substrate; a pluggable electrical interface disposed on the substrate and electrically connected with the interface integrated circuits; and a coupling optical system.

20 Claims, 33 Drawing Sheets

PLUGGABLE OPTICAL TRANSCEIVER

CROSS-REFERENCE TO RELATED APPLICATIONS

This application claims the benefit of U.S. Provisional Patent Application No. 61/605,775 filed on Mar. 2, 2012; the contents of which is hereby incorporated by reference.

FIELD OF THE PATENT APPLICATION

The present patent application generally relates to electrical and optical communication technologies and more specifically to a pluggable optical transceiver that has a simple structure and is easy to assemble.

BACKGROUND

Pluggable optical transceiver is an essential building block for implementing high-speed interconnects in data centers, mobile base-stations and high-performance computing applications for connecting routers, base-band network equipment and computer processors located in separate chassis within the data centers. A typical transmission distance within a data center is around 300 meters. In this type of applications, high-speed data (10 Gb/s or higher) to be transmitted over the interconnect is converted to optical signals by the transmitter, typically based on vertical cavity surface emitting laser (VCSEL) emitting at 850 nm wavelength within the transceiver, and transmitted over multi-mode optical fibers. At the other end of the link, the signal is converted back to electrical signals by the receiver portion of another transceiver. The exponential growth of mobile data usage, cloud computing and big-data applications has led to increased demand for network equipment and high-performance computer equipment. This also drives up the demand for high-speed optical interconnects. There is therefore an increasing need for low-cost optical transceivers for implementing this type of interconnects.

Optical transceivers used in data-center applications often follow a multi-source agreement (MSA) form-factor. Small form-factor pluggable (SFP) is one such form-factor. In conventional SFP/SFP+ transceivers, the laser and the photodiode (PD) are separately packaged into metal-can packages to form a transmitter and receiver optical sub-assembly (OSA). The optics on the OSA required for optical signal coupling with external fibers are manually aligned with the laser and photodiodes within the OSA's. These sub-assemblies are subsequently soldered onto a printed circuit boards (PCB) having laser driver integrated circuit (IC), receiver IC and micro-controller assembled thereon. This assembly is then fitted into a SFP-compliant housing to form the final product. This transceiver design requires many components and a complex assembly process and therefore drives up the cost of the transceiver.

SUMMARY

The present patent application is directed to a pluggable optical transceiver. In one aspect, the pluggable optical transceiver includes: a top housing; a bottom housing; and an optical-electrical assembly enclosed by the top housing and the bottom housing. The optical-electrical assembly includes a substrate; at least a transmitting optoelectronic component disposed on the substrate; at least a receiving optoelectronic component disposed on the substrate; interface integrated circuits disposed on the substrate; a pluggable electrical interface disposed on the substrate and electrically connected with the interface integrated circuits; and a coupling optical system. The coupling optical system includes an external pluggable optical interface, a coupling optical element fixedly mounted on the substrate, and a light-guiding structure optically connecting the external pluggable optical interface and the coupling optical element. The coupling optical element is configured to couple a first optical signal from the transmitting optoelectronic component to the light-guiding structure, and to couple a second optical signal from the light-guiding structure to the receiving optoelectronic component. The light-guiding structure is configured to couple the first optical signal to the external pluggable optical interface, and to couple the second optical signal from the external pluggable optical interface. The external pluggable optical interface is configured to couple the first optical signal to an external transmitting optical fiber, and to couple the second optical signal from a receiving fiber.

The light-guiding structure may include a plurality of reflecting surfaces. The external pluggable optical interface may include a transmitting port and a receiving port. The reflecting surfaces may be configured to couple the first optical signal to the transmitting port, and to couple the second optical signal from the receiving port.

The transmitting optoelectronic component may be a VCSEL. The receiving optoelectronic component may be a photodiode. The transmitting optoelectronic component and the receiving optoelectronic component may be mounted on the substrate with a spacing of less than 1 mm.

The interface integrated circuits may include a transmitter driver circuit and a receiver circuit. The transmitter driver circuit may be electrically connected to and placed in close proximity to the transmitting optoelectronic component by a distance less than 1 mm. The receiver circuit may be electrically connected to and placed in close proximity to the receiving optoelectronic component by a distance less than 1 mm. The transmitter driver circuit and the receiver circuit may be integrated onto one single chip.

The pitch between the transmitting port and the receiving port may be larger than the pitch of the VCSEL and the photodiode disposed on the substrate. The pitch between the transmitting port and the receiving port may be in compliance with the SFP/SFP+ MSA standards.

The coupling optical element may be bonded onto the substrate and defines a cavity that accommodates the transmitting optoelectronic component, the receiving optoelectronic component and the interface integrated circuits.

The light-guiding structure may include a pair of jumper fibers optically connecting the external pluggable optical interface and the coupling optical element. The pair of jumper fibers may include a transmitting jumper fiber and a receiving jumper fiber. The jumper fibers may be bent by about 90 degrees to directly couple an optical signal from the transmitting optoelectronic component.

The light-guiding structure may include a flexible waveguide substrate being optically connected with the external pluggable optical interface.

The light-guiding structure may further include a jumper plug configured for mechanically fixing the position of the jumper fibers to match the pitch of the transmitting optoelectronic component and the receiving optoelectronic component. The jumper fibers may be terminated at an end facet of the jumper plug.

The top housing and the bottom housing may be made of metal. The pluggable optical transceiver may further include a top metal shield and a bottom metal shield. The top metal shield and the bottom metal shield may enclose the coupling optical element and the substrate. The top housing and the bottom housing may be made of a non-conductive moldable material.

The coupling optical system may be formed as one single molded optical element. The coupling optical element may further include a latching element being fixed with the substrate. The jumper plug may be detachably engaged with the coupling optical element. The latching element may be configured to prevent the jumper plug from disengaging from the coupling optical element.

In another aspect, the present patent application provides a small form factor pluggable optical transceiver. The small form factor pluggable optical transceiver include: a top housing; a bottom housing; and an optical-electrical assembly enclosed by the top housing and the bottom housing. The optical-electrical assembly includes: a substrate; at least a transmitting optoelectronic component disposed on the substrate; at least a receiving optoelectronic component disposed on the substrate; interface integrated circuits disposed on the substrate; a pluggable electrical interface disposed on the substrate and electrically connected with the interface integrated circuits; and a coupling optical system including an external pluggable optical interface, a coupling optical element fixedly mounted on the substrate, and a light-guiding structure optically connecting the external pluggable optical interface and the coupling optical element. The coupling optical system is configured to couple a first optical signal originated from the transmitting optoelectronic component to the external pluggable optical interface and guide a second optical signal received at the external pluggable optical interface to the receiving optoelectronic component. The coupling optical element is bonded onto the substrate and defines a cavity that accommodates the transmitting optoelectronic component, the receiving optoelectronic component and the interface integrated circuits. The top housing and the bottom housing are made of metal.

The light-guiding structure may include a pair of jumper fibers optically connecting the external pluggable optical interface and the coupling optical element. The pair of jumper fibers may include a transmitting jumper fiber and a receiving jumper fiber.

In yet another aspect, the present patent application provides a pluggable optical transceiver including: a top housing; a bottom housing; and an optical-electrical assembly enclosed by the top housing and the bottom housing. The optical-electrical assembly includes: a substrate; at least a transmitting optoelectronic component disposed on the substrate; at least a receiving optoelectronic component disposed on the substrate; interface integrated circuits disposed on the substrate; a pluggable electrical interface disposed on the substrate and electrically connected with the interface integrated circuits; and a coupling optical system including an external pluggable optical interface, a coupling optical element fixedly mounted on the substrate, and a light-guiding structure optically connecting the external pluggable optical interface and the coupling optical element. The coupling optical element is configured to couple a first optical signal from the transmitting optoelectronic component to the light-guiding structure, and to couple a second optical signal from the light-guiding structure to the receiving optoelectronic component. The light-guiding structure is configured to couple the first optical signal to the external pluggable optical interface, and to couple the second optical signal from the external pluggable optical interface. The external pluggable optical interface is configured to couple the first optical signal to an external transmitting optical fiber, and to couple the second optical signal from a receiving fiber. The interface integrated circuits include a transmitter driver circuit and a receiver circuit. The transmitter driver circuit is electrically connected to and placed in close proximity to the transmitting optoelectronic component by a distance less than 1 mm. The receiver circuit is electrically connected to and placed in close proximity to the receiving optoelectronic component by a distance less than 1 mm. The light-guiding structure includes a flexible waveguide substrate being optically connected with the external pluggable optical interface.

BRIEF DESCRIPTIONS OF THE DRAWINGS

DETAILED DESCRIPTION

Reference will now be made in detail to a preferred embodiment of the pluggable optical transceiver disclosed in the present patent application, examples of which are also provided in the following description. Exemplary embodiments of the pluggable optical transceiver disclosed in the present patent application are described in detail, although it will be apparent to those skilled in the relevant art that some features that are not particularly important to an understanding of the pluggable optical transceiver may not be shown for the sake of clarity.

Furthermore, it should be understood that the pluggable optical transceiver disclosed in the present patent application is not limited to the precise embodiments described below and that various changes and modifications thereof may be effected by one skilled in the art without departing from the spirit or scope of the protection. For example, elements and/or features of different illustrative embodiments may be combined with each other and/or substituted for each other within the scope of this disclosure.

Figure 1:
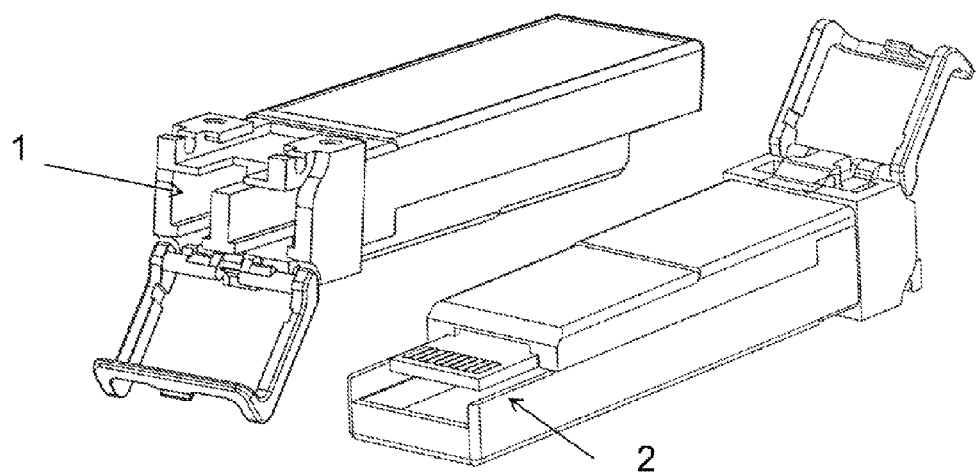
FIG. 1 shows front and rear perspective views of a small form-factor pluggable (SFP) module according to an embodiment of the present patent application.
Figure 2:
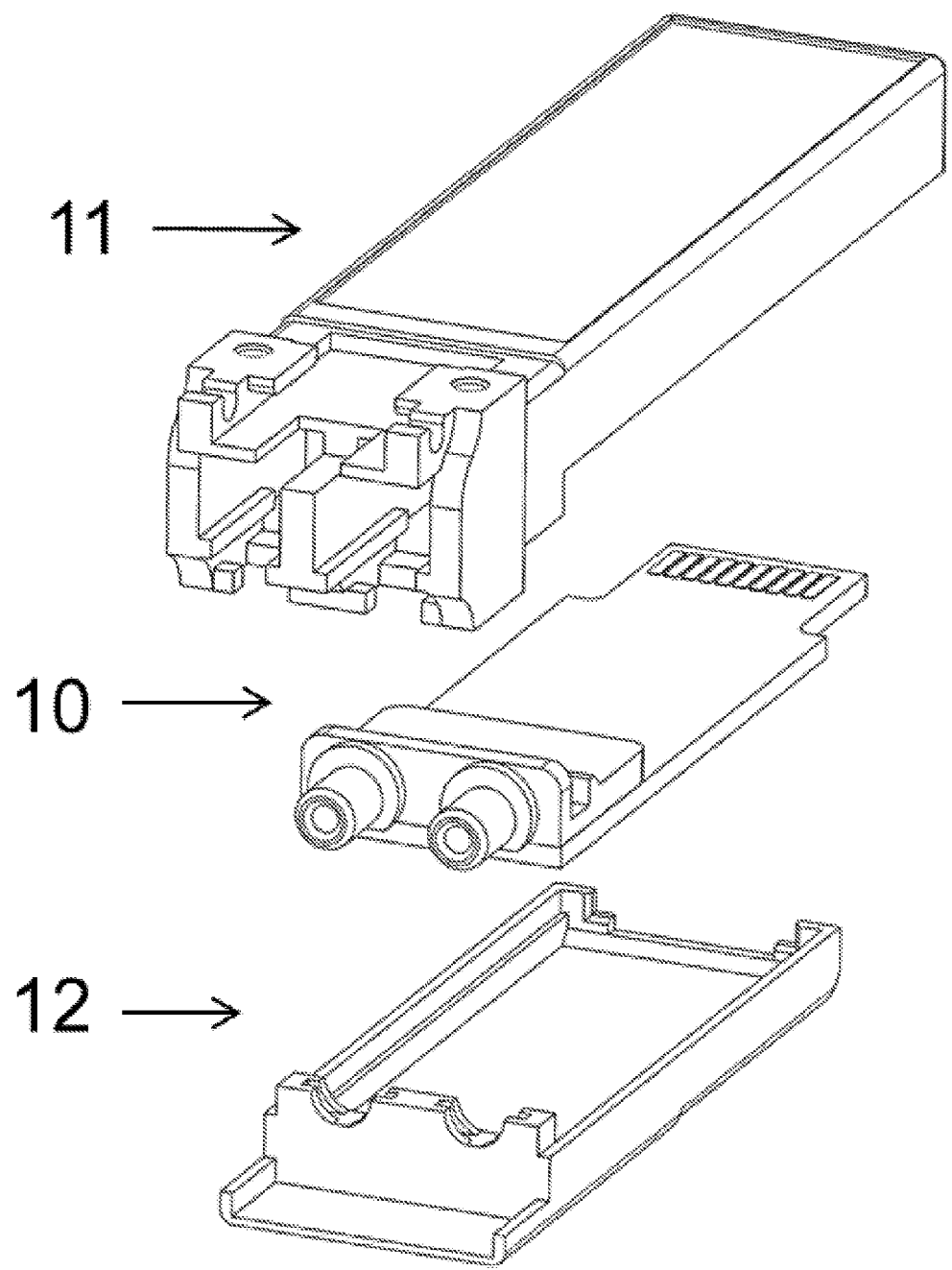
FIG. 2 is an exploded view of the SFP module depicted in FIG. 1.
Figure 3:
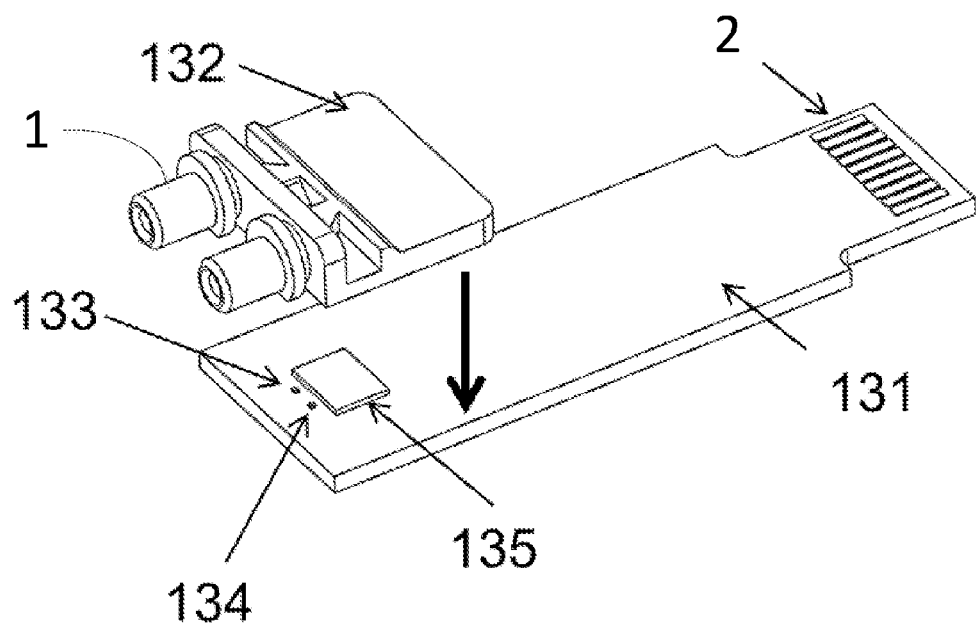
FIG. 3 is an exploded view of the optical-electrical (OE) assembly in the SFP module depicted in FIG. 1.
Figure 4:
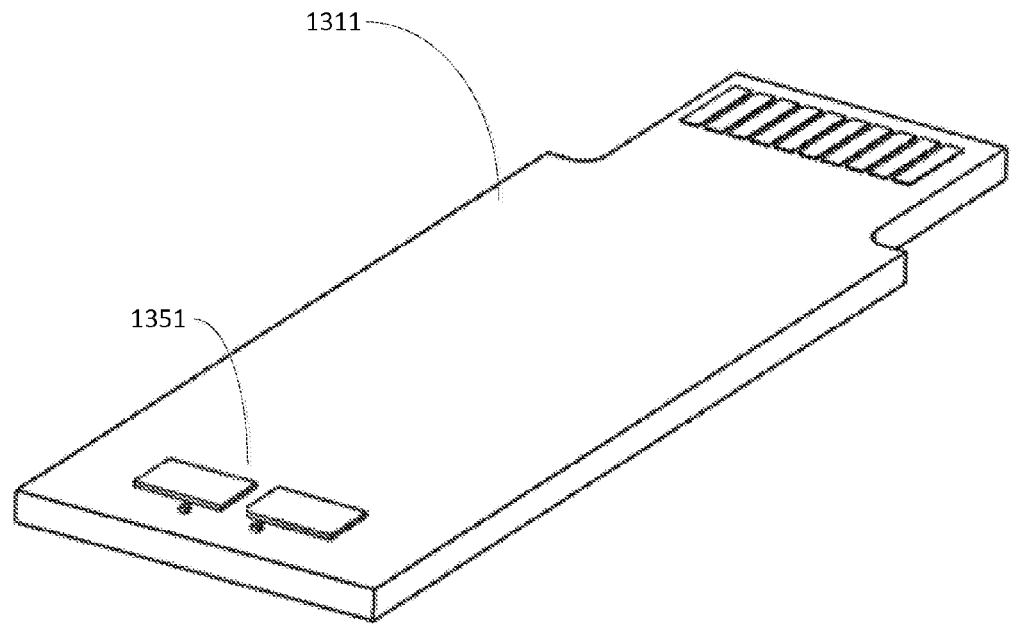
FIG. 4 illustrates the substrate with separate driver and receiver ICs in a SFP module according to another embodiment of the present patent application.

FIG. 1 shows front and rear perspective views of a small form-factor pluggable (SFP) module according to an embodiment of the present patent application. The SFP module in this embodiment is also referred to as the Type 1 design. In FIG. 1, a pluggable optical interface 1 (also shown in FIG. 3) at the front and a pluggable electrical interface 2 at the rear are shown. FIG. 2 is an exploded view of the SFP module depicted in FIG. 1. Referring to FIG. 2, the SFP module includes a top metal housing 11, a bottom metal housing 12 and an optical-electrical (OE) assembly 10. FIG. 3 is an exploded view of the optical-electrical assembly in the SFP module depicted in FIG. 2. Referring to FIG. 3, a light source 133, a PD 134, a combined driver and receiver IC 135 are bonded in close proximity to each other onto a substrate 131 to form the OE assembly 10. The distance between the light source and the PD is typically less than 1 mm. The distance between the light source (or PD) to the IC 135 is typically less than 1 mm. The IC 135 is electrically connected to the pluggable electrical interface 2, which is disposed at the other end of the substrate 131, and a part of the aforementioned OE assembly 10. In addition to the substrate 131, the light source 133, the PD 134, the combined driver and receiver IC 135, and the pluggable electrical interface 2, the OE assembly 10 further includes a coupling optical system, which will be described in more detail hereafter. The coupling optical system is formed as one single molded optical element 132 fixedly mounted to the substrate 131. Other active and passive electronic components may also be required and can be populated in other areas of the substrate 131. In another embodiment, as illustrated in FIG. 4, separate driver and receiver ICs 1351 are mounted onto the substrate 1311. It is noted that in this embodiment as well as the embodiments described hereafter, the coupling optical system is configured to couple a first optical signal originated from the light source to the pluggable optical interface and guide a second optical signal received at the pluggable optical interface to the photodiode (PD). It is further noted that the light source 133 in this embodiment may be a VCSEL, and may be substituted by a transmitting optoelectronic component of other types. The PD 134 in this embodiment may be substituted by a receiving optoelectronic component of other types. The combined driver and receiver IC 135 may be substituted by interface integrated circuits of other types.

Figure 5:
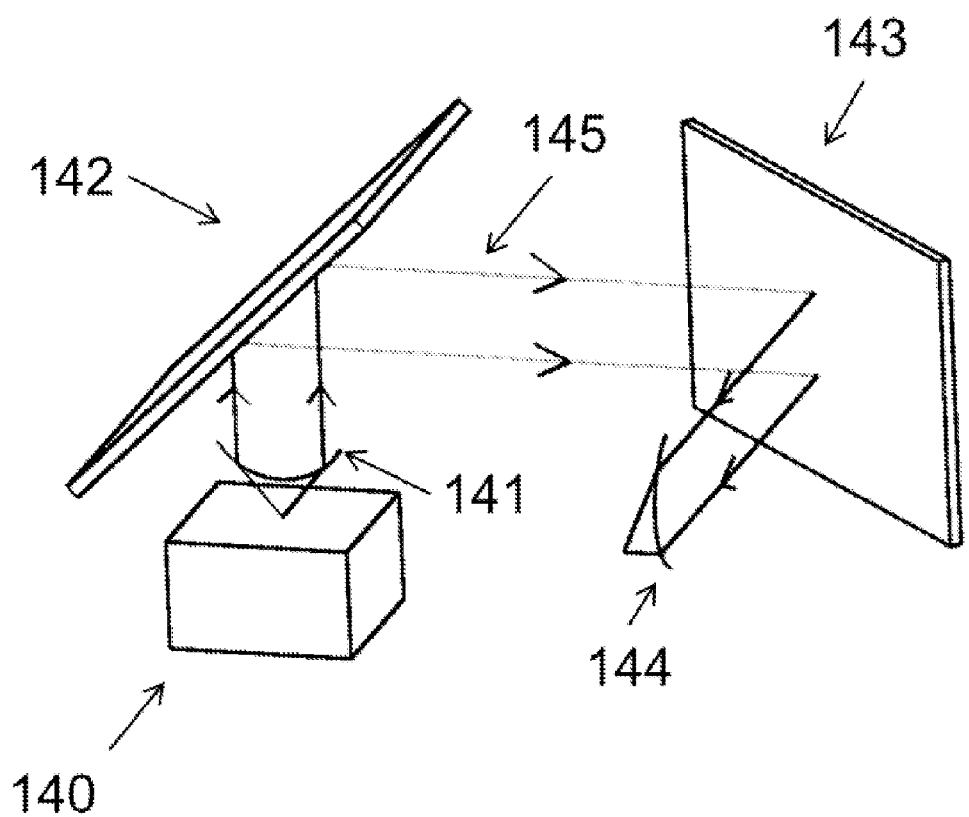
FIG. 5 shows the optical path of the coupling optical system formed in the molded optical element depicted in FIG. 3.
Figure 6:
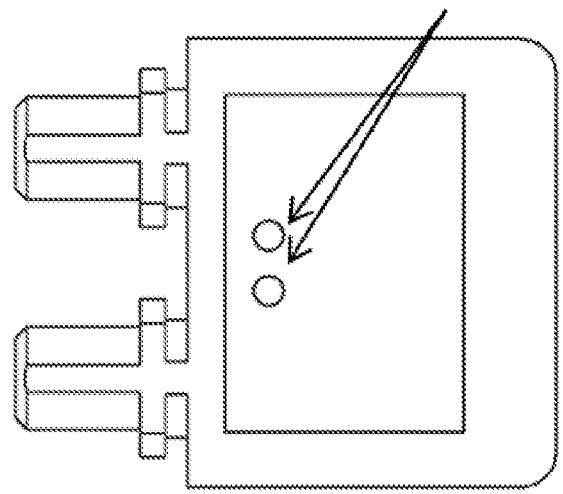
FIG. 6 shows top, bottom and cross-sectional views of the molded optical element (the coupling optical system) in the OE assembly depicted in FIG. 3.
Figure 6:
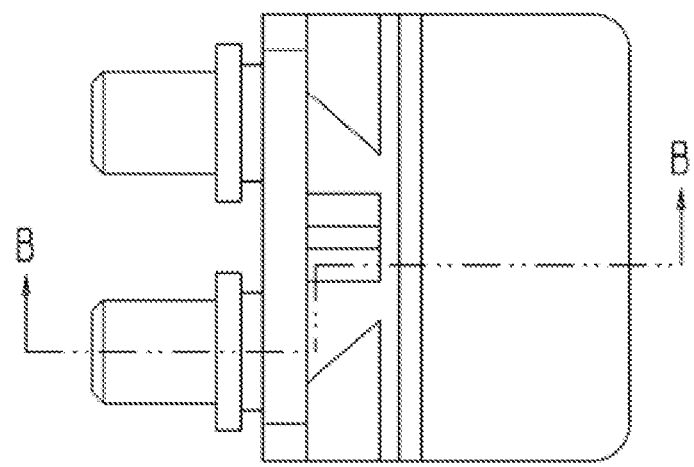
Figure 6:
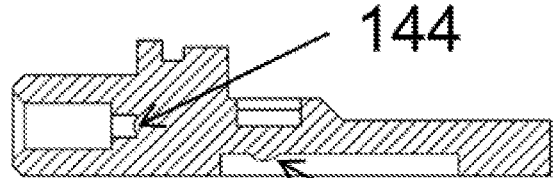

FIG. 5 shows the optical path of the coupling optical system formed in the molded optical element 132 in FIG. 3. Referring to FIG. 5, light emitted by the optical device 140 first passes through the first lens surface 141, which sufficiently collimates the light. The beam is then directed by the first and second reflecting surfaces 142 and 143, and refocused by the second lens surface 144 before passing through a transmitting port of the pluggable optical interface 1 and reaching the external area for fiber coupling. The reflecting surfaces 142 and 143 can be implemented through total internal reflection or reflective coating. FIG. 6 shows top, bottom and cross-sectional views of the molded optical element 132 (the coupling optical system). It is understood that light received from a receiving port of the pluggable optical interface 1 can travel along an optical path that is essentially reversed to the above-mentioned optical path, being passed by a plurality of reflecting surfaces, and thereby reach the PD 134.

In this embodiment, the coupling optical system includes an external pluggable optical interface (1 in FIG. 1 and FIG. 3), a coupling optical element (141 in FIG. 6) fixedly mounted on the substrate (131), and a light-guiding structure (142, 143, and 144) optically connecting the external pluggable optical interface and the coupling optical element. The coupling optical element is configured to couple a first optical signal from the transmitting optoelectronic component to the light-guiding structure, and to couple a second optical signal from the light-guiding structure to the receiving optoelectronic component. The light-guiding structure is configured to couple the first optical signal to the external pluggable optical interface, and to couple the second optical signal from the external pluggable optical interface. The external pluggable optical interface is configured to couple the first optical signal to an external transmitting optical fiber, and to couple the second optical signal from a receiving fiber.

Figure 7:
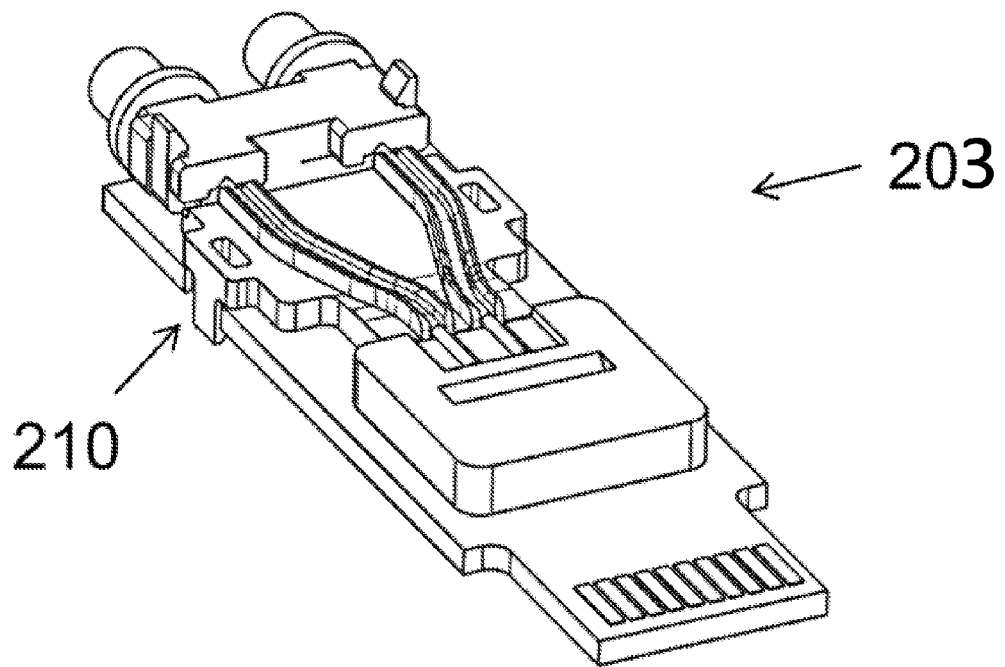
FIG. 7 is a perspective view of the OE assembly in a SFP module according to another embodiment of the present patent application.
Figure 8:
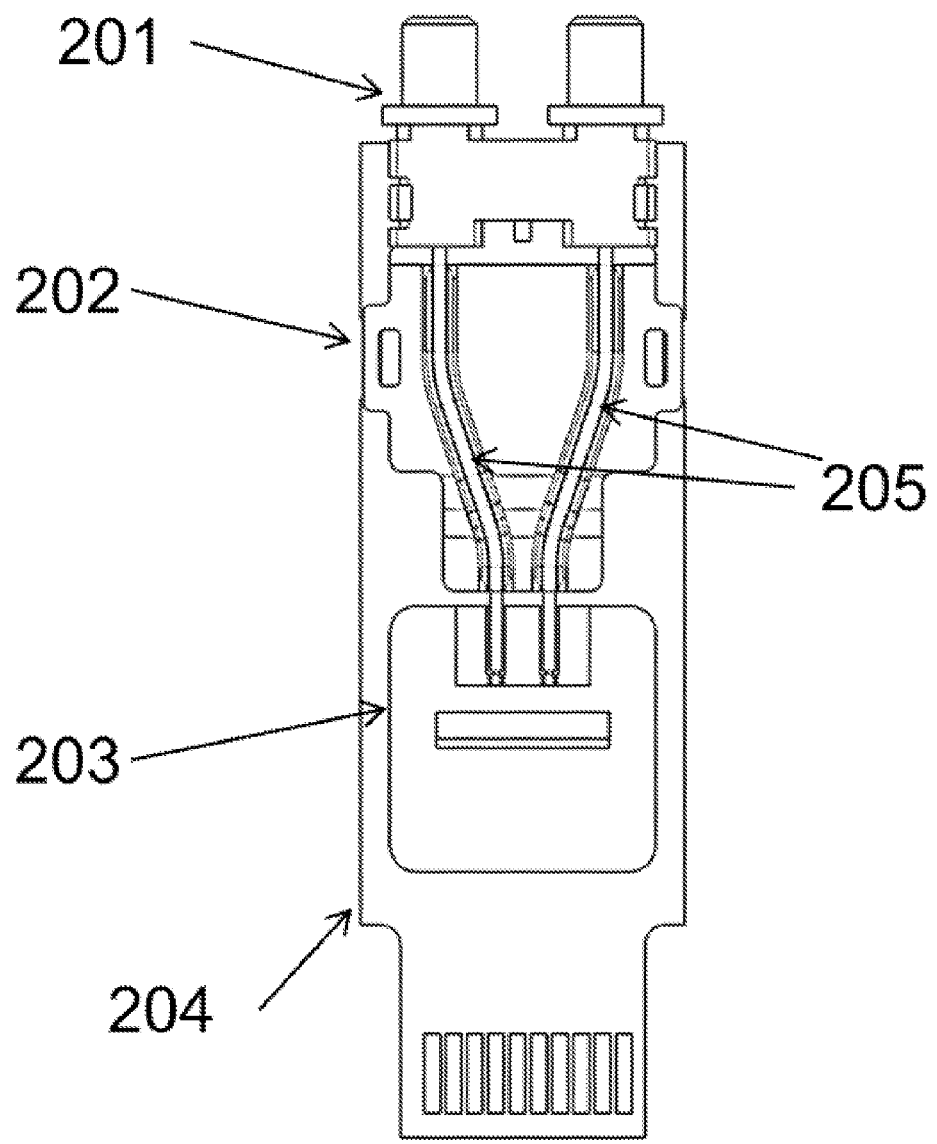
FIG. 8 is a top view of the OE assembly depicted in FIG. 7.
Figure 9:
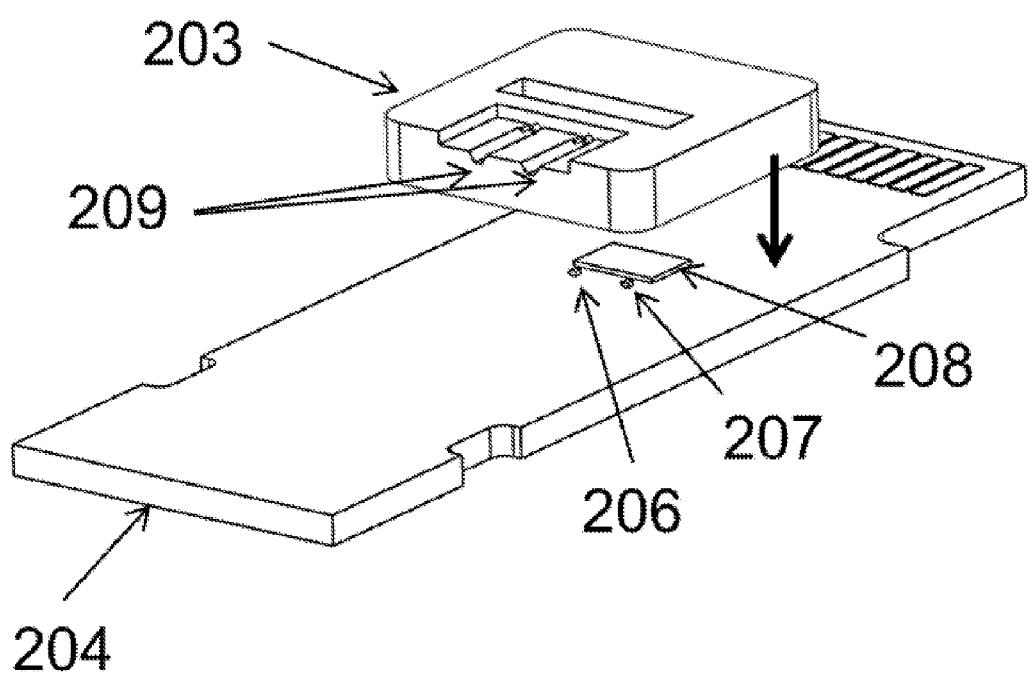
FIG. 9 is an exploded view of the OE assembly depicted in FIG. 7 without the external pluggable optical interface and the light-guiding structure depicted in FIG. 8.
Figure 10:
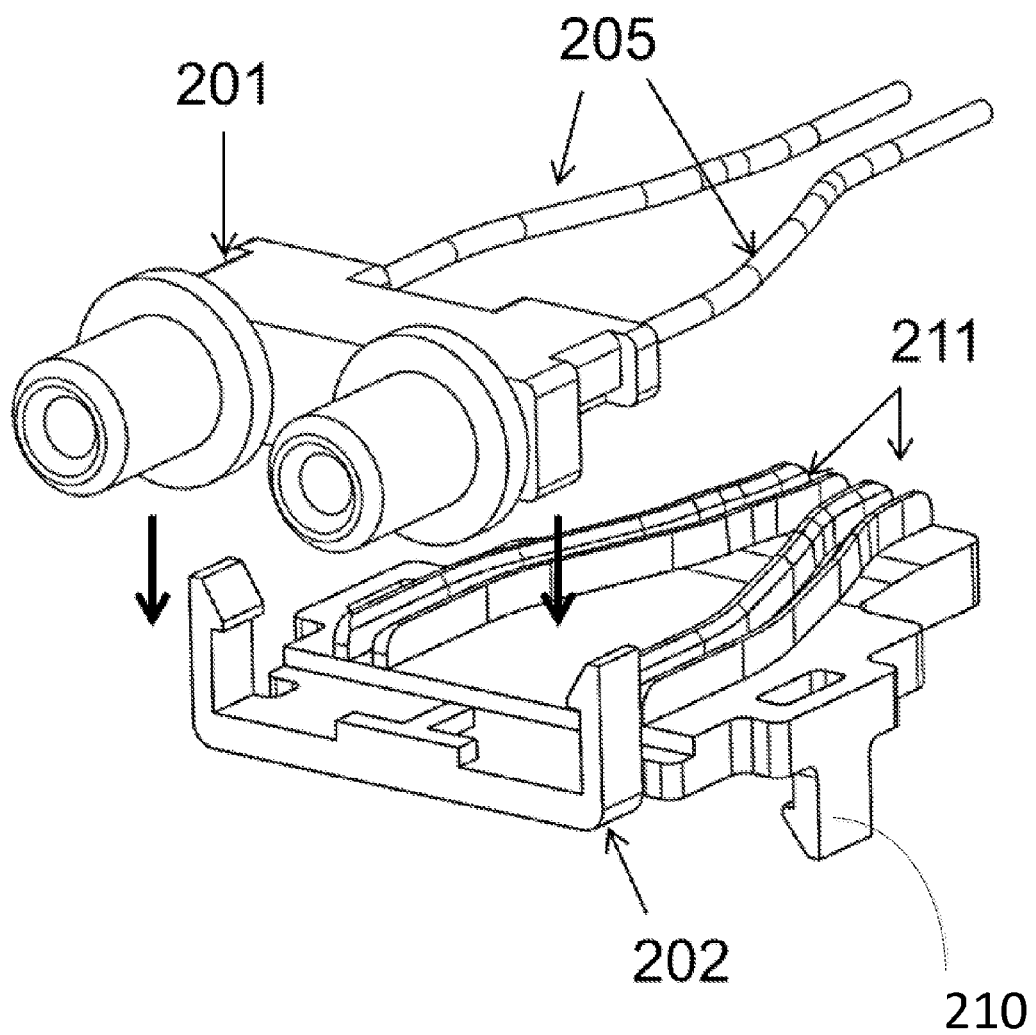
FIG. 10 is an exploded view of the external pluggable optical interface and the light-guiding structure depicted in FIG. 8.
Figure 11:
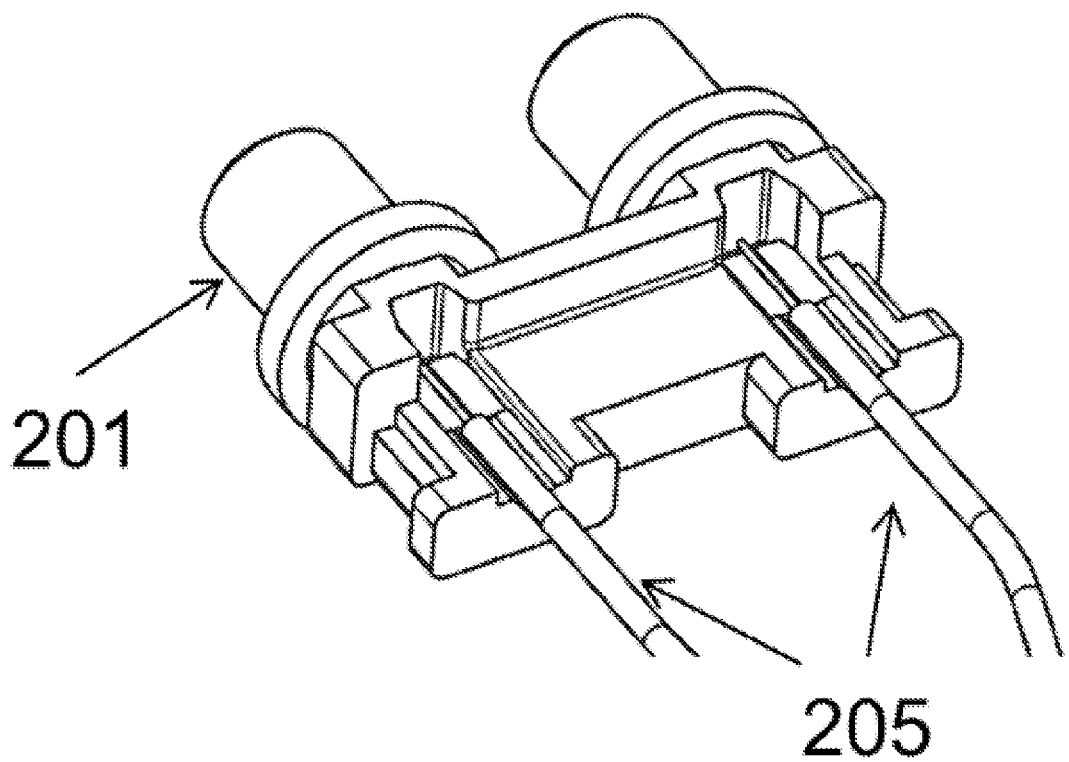
FIG. 11 is a bottom perspective view of the external pluggable optical interface and the light-guiding structure depicted in FIG. 8 after being assembled in the SFP module.

FIG. 7 is a perspective view of the OE assembly in a SFP module according to another embodiment of the present patent application. The SFP module in this embodiment is also referred to as the Type 2 design. FIG. 8 is a top view of the OE assembly depicted in FIG. 7. Referring to FIG. 7 and FIG. 8, the OE assembly includes a front lens block 201 and rear lens block 203. The front lens block 201 serves as a pluggable optical port (i.e. an external pluggable optical interface) for external fibers. The rear lens block 203 is bonded onto the substrate 204 and defines a cavity to accommodate the laser 206, the PD 207, the IC 208, as illustrated in FIG. 9, which is an exploded view of the OE assembly depicted in FIG. 7 without the external pluggable optical interface 201 and the light-guiding structure 205 depicted in FIG. 8. These parts are placed near the rear end of the substrate 204 to minimize the transmission distance of electrical signal through the conductive traces on the substrate 204. Referring to FIG. 8, the front lens block 201 is optically connected to the rear lens block 203 through a light-guiding structure 205. The light-guiding structure 205 includes a pair of jumper fibers or any forms of optical waveguides (illustrated in another embodiment described in more detail hereafter), and considered as a part of the coupling optical system of the OE assembly in this embodiment. The pair of jumper fibers include a transmitting jumper fiber and a receiving jumper fiber. A support structure 202 is positioned between the front lens block 201 and the rear lens block 203 and configured to provide mechanical support for the light-guiding structure 205. FIG. 10 is an exploded view of the external pluggable optical interface 201 and the light-guiding structure 205 depicted in FIG. 8. Referring to FIG. 10, the light-guiding structure 205 can be positioned within the protective grooves 211 on the support structure 202. A pair of snap structures 210, extending from the support structure 202, secure the light-guiding structure 205 onto the substrate 204. The coupling structures 209 on the lens block 203 facilitate optical alignment of one end of the light-guiding structure 205 with the lens on the lens block 203 to maximize optical coupling. Adhesive is used to fix one end of the light-guiding structure 205 onto the lens block 203 to ensure stable optical coupling. FIG. 11 is a bottom perspective view of the external pluggable optical interface 201 and the light-guiding structure 205 depicted in FIG. 8 after being assembled in the SFP module.

Figure 12:
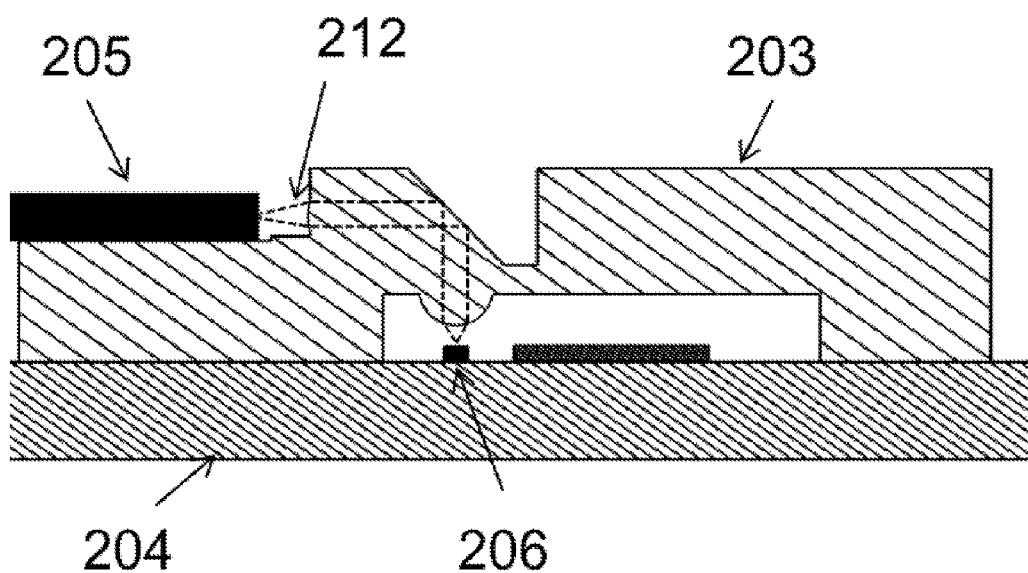
FIG. 12 is a cross-sectional view showing the light path of the coupling optical element in the SFP module depicted in FIG. 7.
Figure 13:
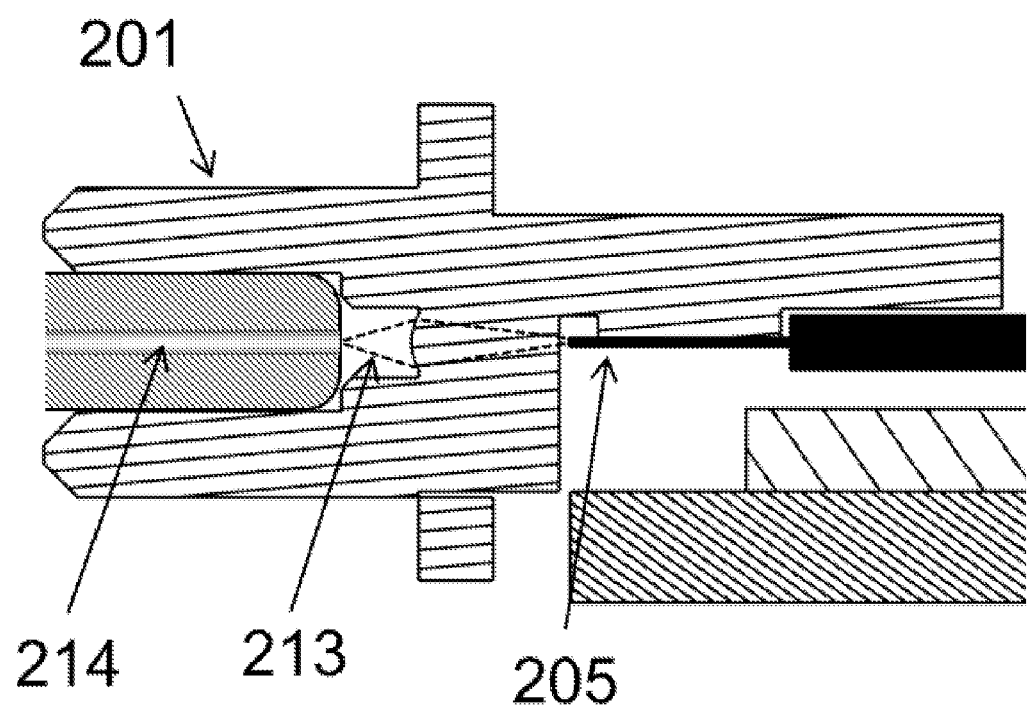
FIG. 13 is a cross-sectional view showing the light path of the external pluggable interface in the SFP module depicted in FIG. 7.

FIG. 12 is a cross-sectional view showing the light path of the coupling optical element (203 in FIG. 8) in the SFP module depicted in FIG. 7. FIG. 13 is a cross-sectional view showing the light path of the external pluggable interface in the SFP module depicted in FIG. 7. Referring to FIG. 12, it shows the optical path 212 starting from the laser 206 through the lens block 203 to the light-guiding structure 205. The other end of the light-guiding structure 205 is fixed onto the back side of the front lens block 201, also with adhesive. FIG. 13 shows the optical path 213 starting from an end of the light-guiding structure 205 to an external fiber core 214 through the front lens block 201.

The coupling optical system in this embodiment includes an external pluggable optical interface (201 in FIG. 8), a coupling optical element (203 in FIG. 8) fixedly mounted on the substrate, and a light-guiding structure (205 in FIG. 8) optically connecting the external pluggable optical interface and the coupling optical element. The coupling optical element is configured to couple a first optical signal from the transmitting optoelectronic component to the light-guiding structure, and to couple a second optical signal from the light-guiding structure to the receiving optoelectronic component. The light-guiding structure is configured to couple the first optical signal to the external pluggable optical interface, and to couple the second optical signal from the external pluggable optical interface. The external pluggable optical interface is configured to couple the first optical signal to an external transmitting optical fiber, and to couple the second optical signal from a receiving fiber.

Figure 14:
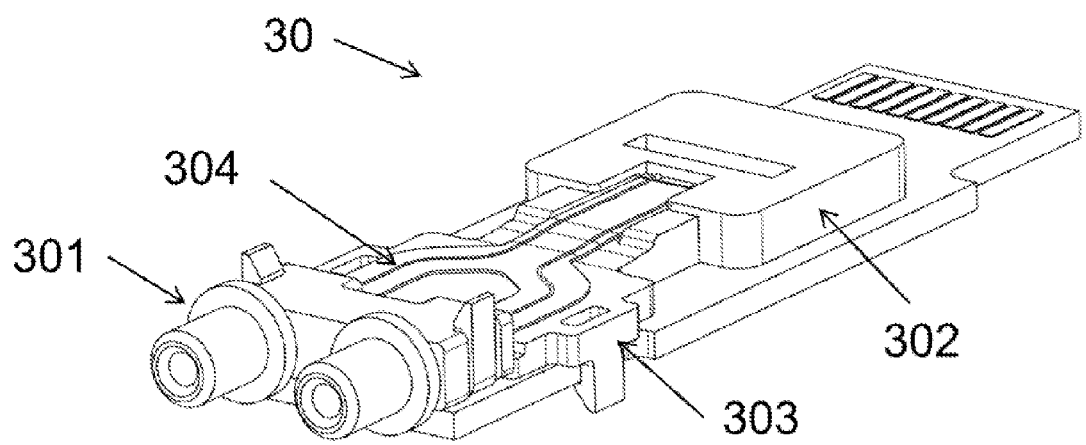
FIG. 14 is a perspective view of the OE assembly in a SFP module according to another embodiment of the present patent application.
Figure 15:
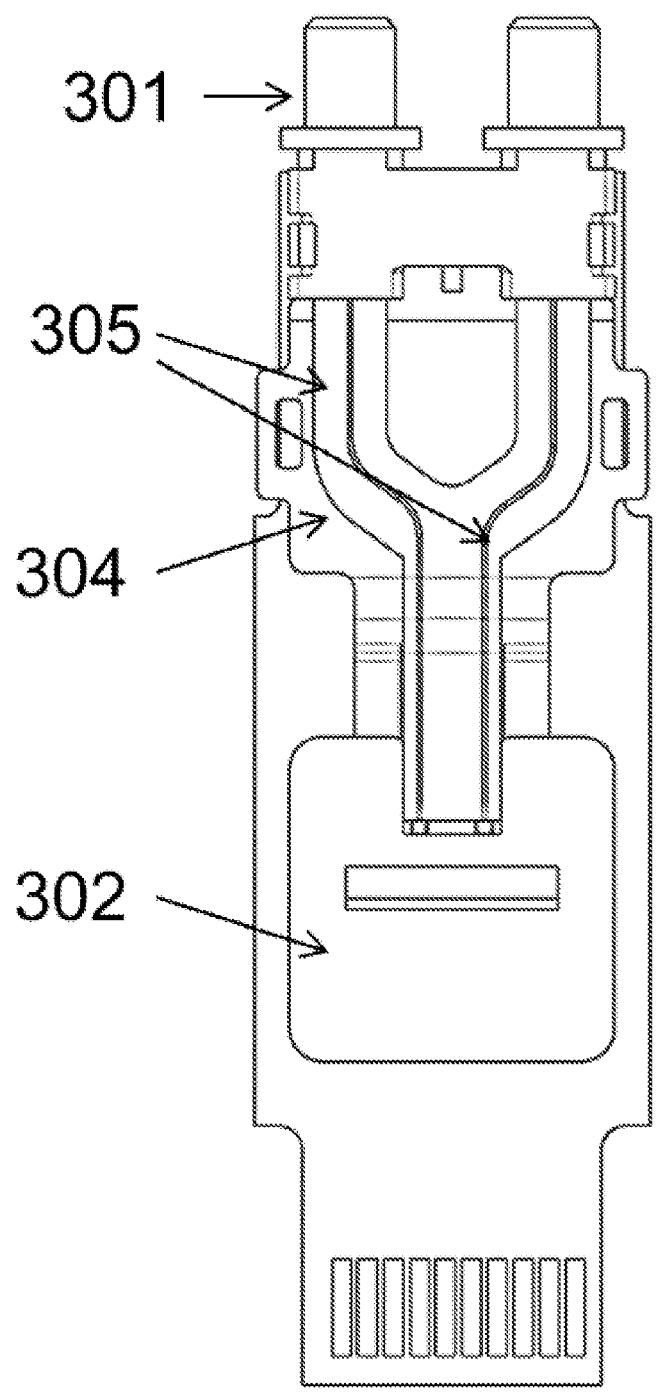
FIG. 15 is a top view of the OE assembly depicted in FIG. 14.
Figure 16:
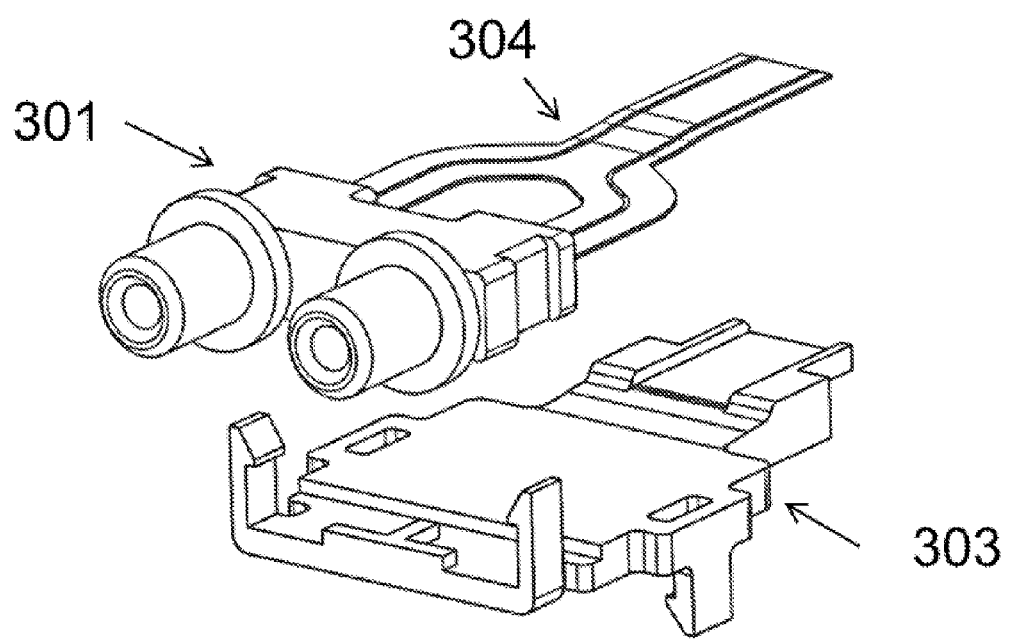
FIG. 16 is an exploded view of the front optical port with jumper waveguide of the OE assembly depicted in FIG. 14.

FIG. 14 is a perspective view of the OE assembly in a SFP module according to another embodiment of the present patent application. The SFP module in this embodiment is also referred to as the Type 3 design. FIG. 15 is a top view of the OE assembly depicted in FIG. 14. FIG. 16 is an exploded view of the front optical port with jumper waveguide of the OE assembly depicted in FIG. 14. Referring to FIGS. 14-16, the Type 3 design is similar to the Type 2 design. The major difference is that the light-guiding structure 205 optically connecting the front lens block 301 (the pluggable optical interface in this embodiment) and rear lens block 302 is replaced with a piece of flexible waveguide substrate (optical waveguide sheet) 304, which is a part of the coupling optical system in this embodiment. Embedded in the waveguide substrate 304 are a number of waveguides 305 configured to guide the optical signal between the front lens block 301 and rear lens block 302 for each of the transmitting and receiving optical channel. Similar to the Type 2 design, a supporting structure 303 is positioned between front lens block 301 and rear lens block 302 to provide mechanical support for the light-guiding structure 304.

The coupling optical system in this embodiment includes an external pluggable optical interface (301 in FIG. 15), a coupling optical element (302 in FIG. 15) fixedly mounted on the substrate, and a light-guiding structure (304, 305 in FIG. 15) optically connecting the external pluggable optical interface and the coupling optical element. The coupling optical element is configured to couple a first optical signal from the transmitting optoelectronic component to the light-guiding structure, and to couple a second optical signal from the light-guiding structure to the receiving optoelectronic component. The light-guiding structure is configured to couple the first optical signal to the external pluggable optical interface, and to couple the second optical signal from the external pluggable optical interface. The external pluggable optical interface is configured to couple the first optical signal to an external transmitting optical fiber, and to couple the second optical signal from a receiving fiber.

Figure 17:
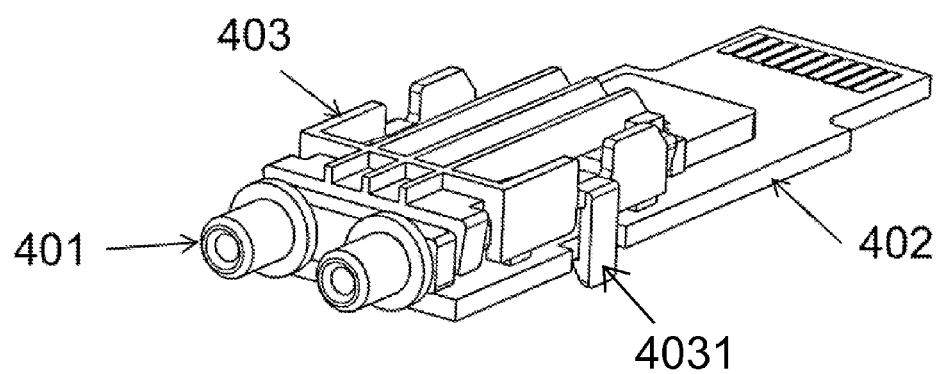
FIG. 17 is a perspective view of the OE assembly in a SFP module according to another embodiment of the present patent application.
Figure 18:
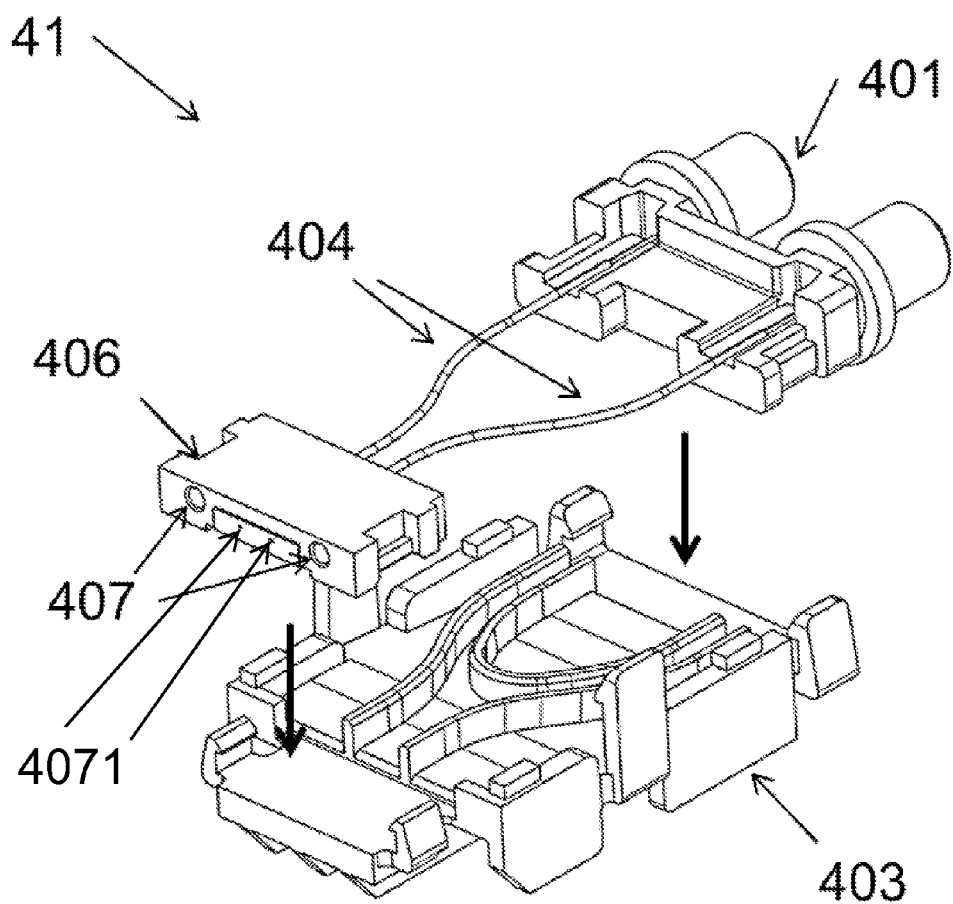
FIG. 18 is an exploded view of the pluggable jumper assembly with the front lens block in the OE assembly depicted in FIG. 17.
Figure 19:
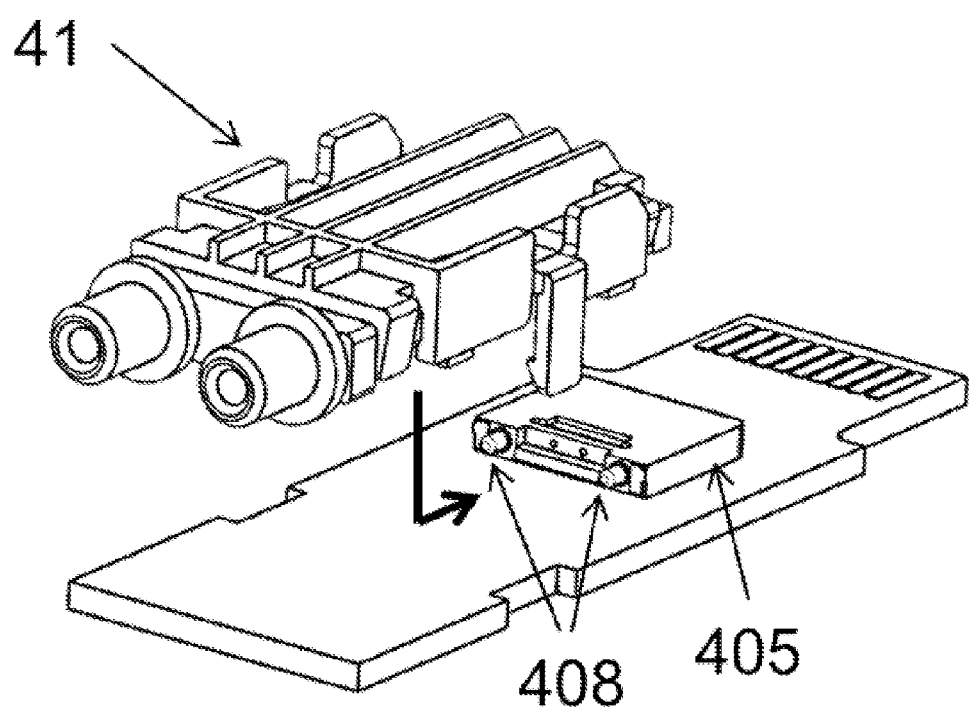
FIG. 19 is an exploded view of the pluggable jumper assembly and the rear lens block being assembled in the OE module depicted in FIG. 17.
Figure 20:
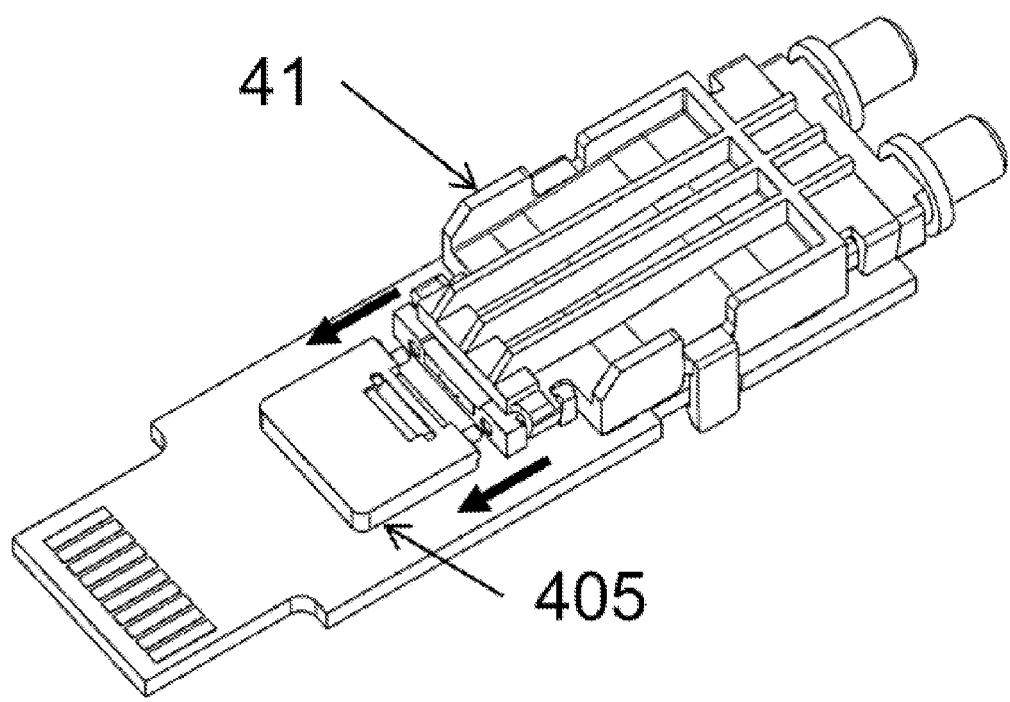
FIG. 20 is another view of the pluggable jumper assembly and the rear lens block being assembled in the OE assembly depicted in FIG. 17.

FIG. 17 is a perspective view of the OE assembly in a SFP module according to another embodiment of the present patent application. FIG. 18 is an exploded view of a pluggable jumper assembly 41 with a front lens block 401 in the OE assembly depicted in FIG. 17. FIG. 19 is an exploded view of the pluggable jumper assembly 41 and a rear lens block 405 being assembled in the OE assembly depicted in FIG. 17. FIG. 20 is another view of the pluggable jumper assembly 41 and the rear lens block 405 being assembled in the OE assembly depicted in FIG. 17. The SFP module in this embodiment is also referred to as the Type 4 design. Referring to FIGS. 17-20, this type of design has a pluggable jumper assembly 41 which includes a front lens block 401 (the external pluggable optical interface in this embodiment), jumper fibers 404, a fiber support structure 403 and a rear jumper plug 406 configured for mechanically fixing the position of the jumper fibers 404 to match the pitch of the transmitting optoelectronic component and the receiving optoelectronic component in this embodiment. The assembly of 403, 404 and 406 forms the light-guiding structure in this embodiment. The jumper fibers 404, including a transmitting jumper fiber and a receiving jumper fiber, are terminated at the fiber termination holes 4071 at the end facet of the rear jumper plug 406. The rear jumper plug 406 can be engaged with rear lens block 405 for coupling optical signals. The alignment structures 407 on the jumper plug 406 is precisely located with respect to the fiber termination hole 4071 and are configured to mate with corresponding protruding alignment structures 408 on the rear lens block 405 to ensure good alignment. Once the jumper plug 406 is engaged with rear lens block 405, the end facets of the jumper fibers 404 are precisely aligned with the lens elements 4081 on the rear lens block 405. The latching structures 4031 on the fiber support structure 403 prevent the jumper plug 406 from disengaging from the rear lens block 405. Similar to the Type 3 design, the jumper fibers 404 can be replaced by flexible optical waveguides.

The coupling optical system in this embodiment includes an external pluggable optical interface (401 in FIG. 18), a coupling optical element (405 in FIG. 20) fixedly mounted on the substrate, and a light-guiding structure (403, 404 and 406 in FIG. 18) optically connecting the external pluggable optical interface and the coupling optical element. The coupling optical element is configured to couple a first optical signal from the transmitting optoelectronic component to the light-guiding structure, and to couple a second optical signal from the light-guiding structure to the receiving optoelectronic component. The light-guiding structure is configured to couple the first optical signal to the external pluggable optical interface, and to couple the second optical signal from the external pluggable optical interface. The external pluggable optical interface is configured to couple the first optical signal to an external transmitting optical fiber, and to couple the second optical signal from a receiving fiber.

Figure 21:
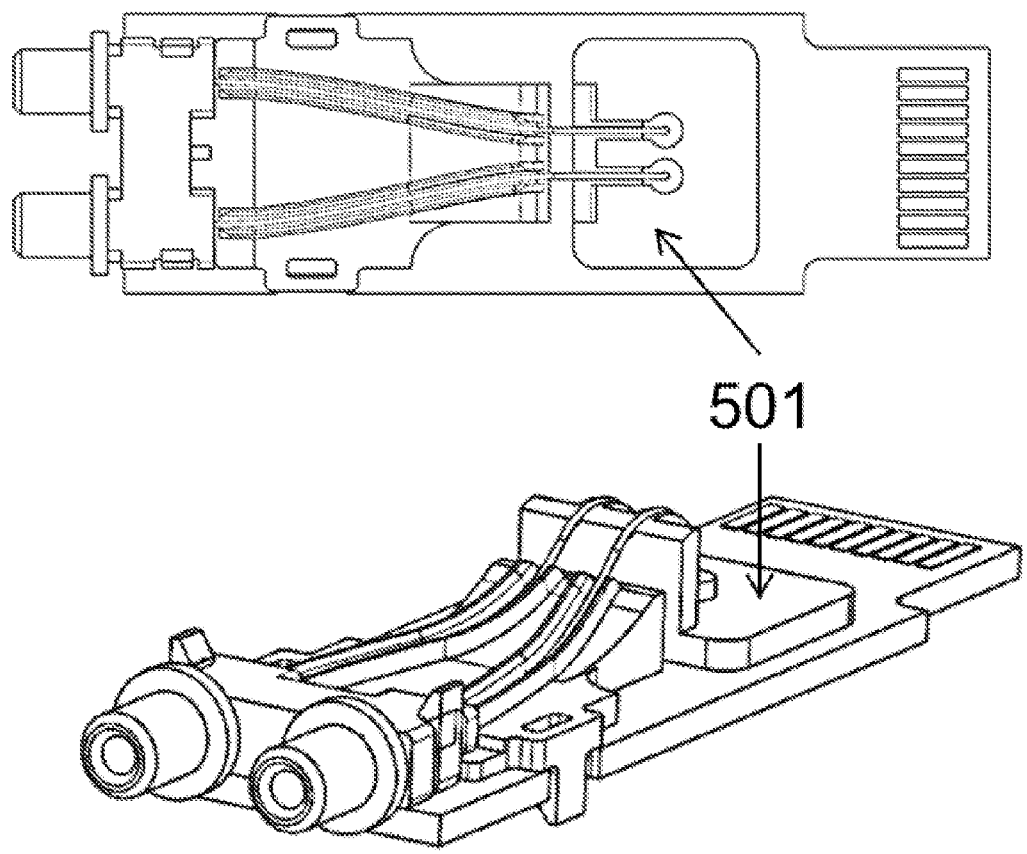
FIG. 21 is a perspective view of the OE assembly in a SFP module according to another embodiment of the present patent application.
Figure 22:
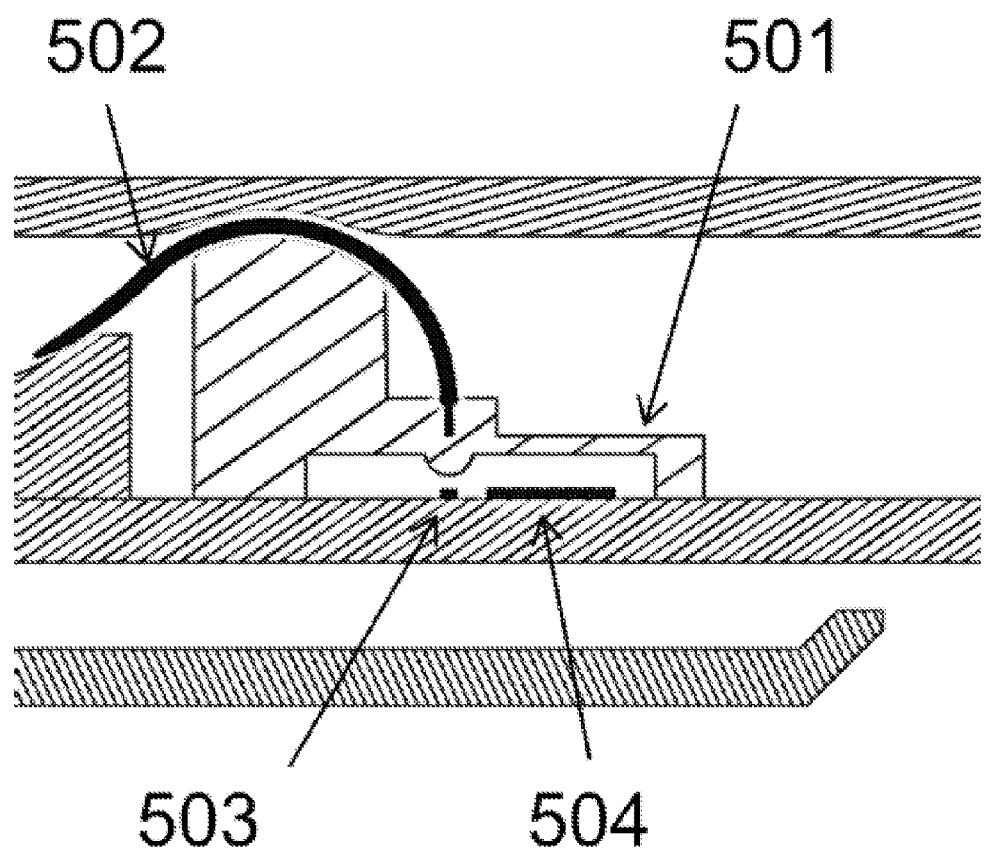
FIG. 22 is cross-section view showing the optical coupling in the OE assembly depicted in FIG. 21.

FIG. 21 is a perspective view of the OE assembly in a SFP module according to another embodiment of the present patent application. FIG. 22 is cross-section view showing the optical coupling in the OE assembly depicted in FIG. 21. The SFP module in this embodiment is also referred to as the Type 5 design. Referring to FIGS. 21-22, this design is similar to the Type 2 design except that the rear lens block 501 (as the coupling optical element in this embodiment) features a different optical design as illustrated in FIG. 22. The light-guiding structure 502 (essentially the jumper fibers in this embodiment) is bent by about 90 degrees to directly couple optical signals from the light source 503.

In the above embodiments, the Type 1-5 designs need to employ metal housing to enclose the OE assemblies to ensure the product's EMI compliance. The following alternative designs show a SFP/SFP+ transceiver using lower cost non-conductive moldable material as the top and bottom housings.

Figure 23:
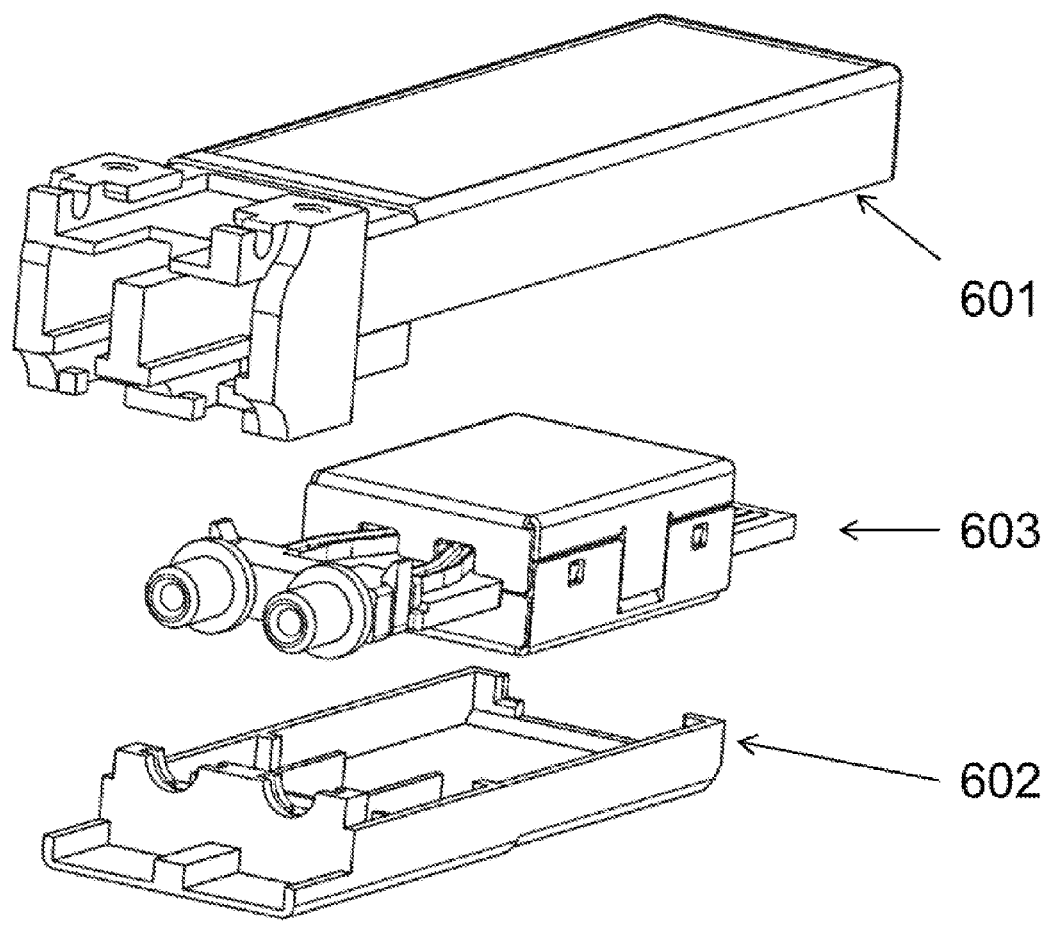
FIG. 23 is an exploded view of a SFP module according to another embodiment of the present patent application.
Figure 24:
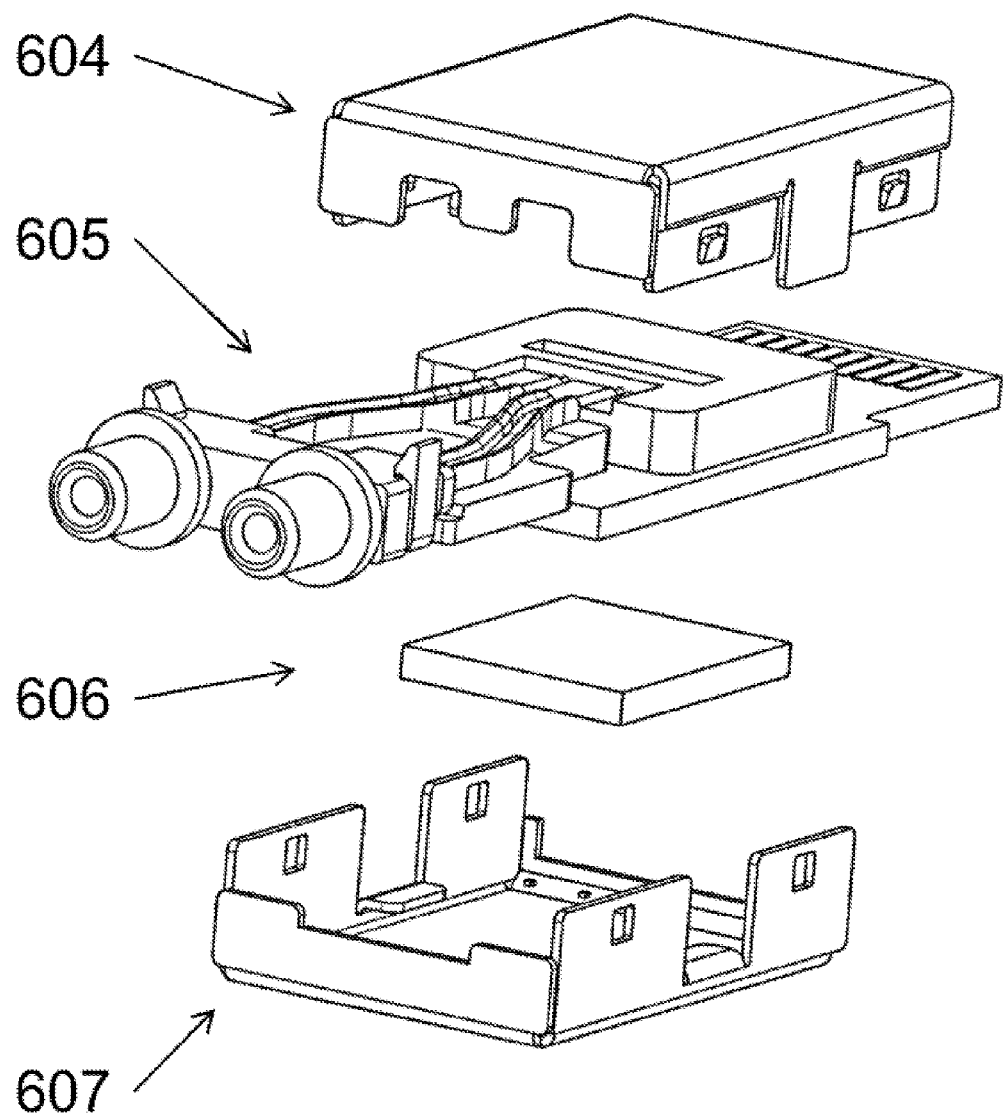
FIG. 24 is an exploded view of the OE assembly with a metal shield in the SFP module depicted in FIG. 23.
Figure 25:
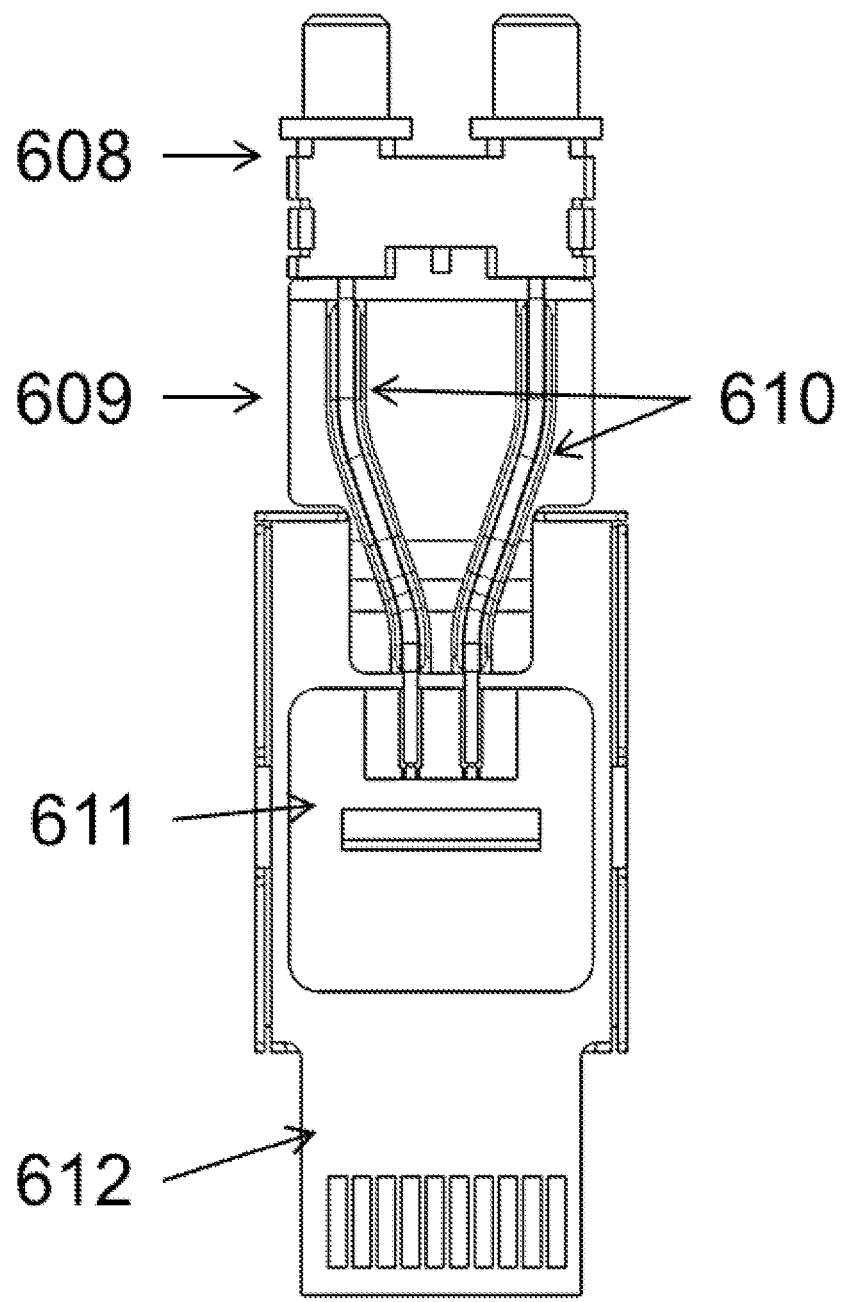
FIG. 25 is a top view of the OE assembly located in the lower metal shield in the SFP module depicted in FIG. 23.

FIG. 23 is an exploded view of a SFP module according to another embodiment of the present patent application. FIG. 24 is an exploded view of the OE assembly with a metal shield in the SFP module depicted in FIG. 23. FIG. 25 is a top view of the OE assembly located in the lower metal shield in the SFP module depicted in FIG. 23. The SFP module in this embodiment is also referred to as the Type 6 design. Referring to FIGS. 23-25, the transceiver module includes a top plastic housing 601, a bottom plastic housing 602 and a middle OE assembly 603 with a circuit substrate 612 and a rear lens block 611 (as the coupling optical element in this embodiment) enclosed by a top metal shield 604 and a bottom metal shield 607. A thermal pad 606 brings the substrate into thermal contact with the lower metal shield 607 to facilitate heat dissipation. Similar to the Type 2 design, the optical signal is transmitted between the optical components on the substrate to the front lens block 608 (the external pluggable optical interface in this embodiment) through the light-guiding structure 610 (as a part of the coupling optical system in this embodiment), which is mechanically supported by the structure 609. As the EMI protection is supported by the metal shields 604 and 607, the external housing can be made of a non-conductive moldable material without degrading the EMI performance of the module.

Figure 26:
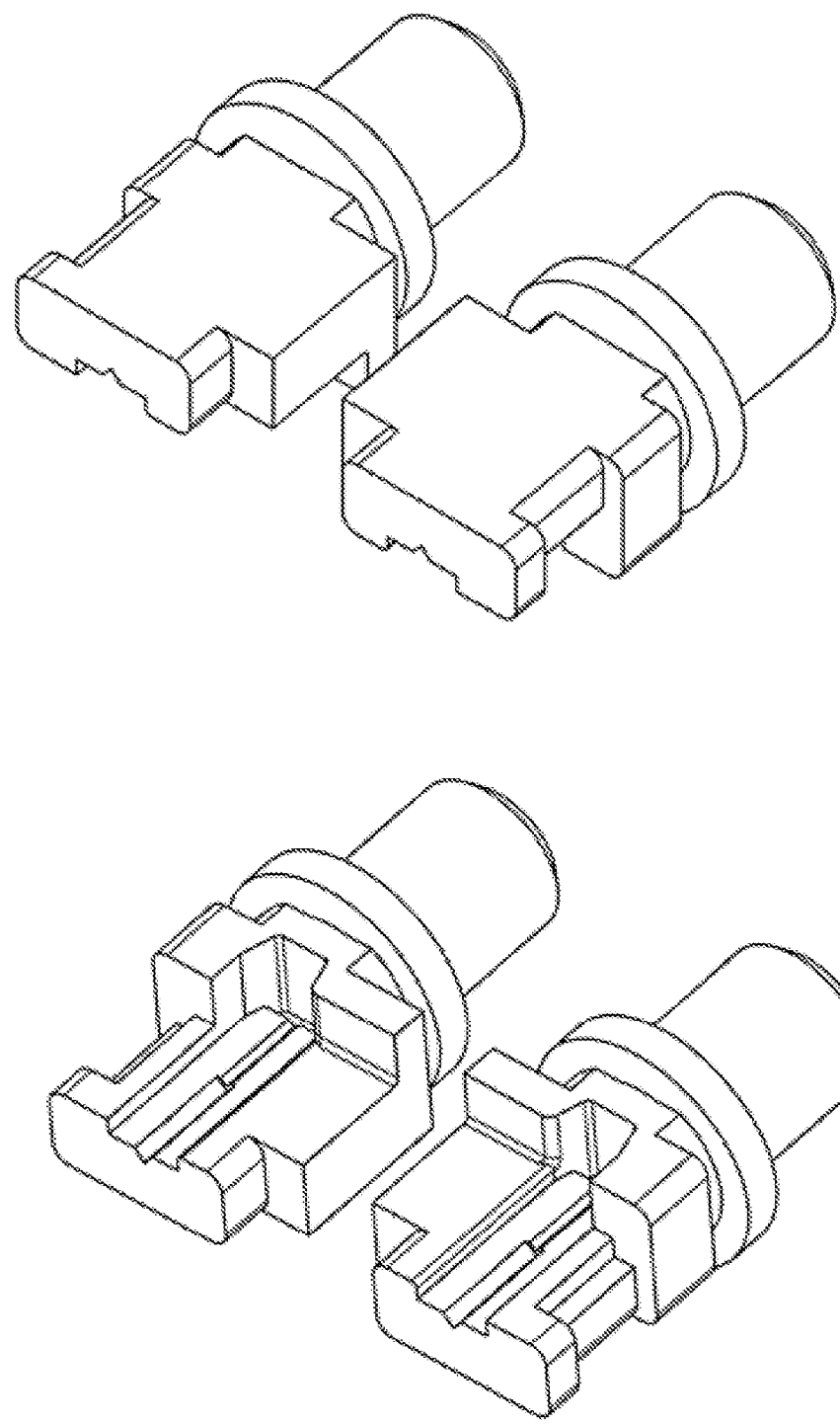
FIG. 26 is a top view and a bottom view of separate-piece front lens blocks in a SFP assembly according to another embodiment of the present patent application.

For the above-mentioned Type 2-6 designs, the front lens block can be one single molded piece. Alternatively, it can include multiple separate pieces, each containing one optical port, as illustrated in FIG. 26.

Figure 27A:
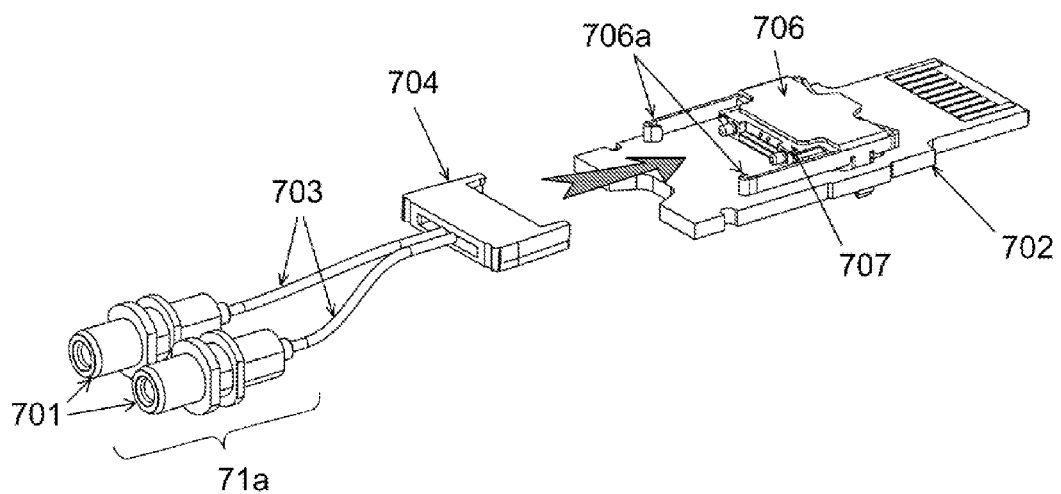
FIG. 27A is a perspective view of the OE assembly in an un-latched position in a SFP module according to another embodiment of the present patent application.
Figure 27B:
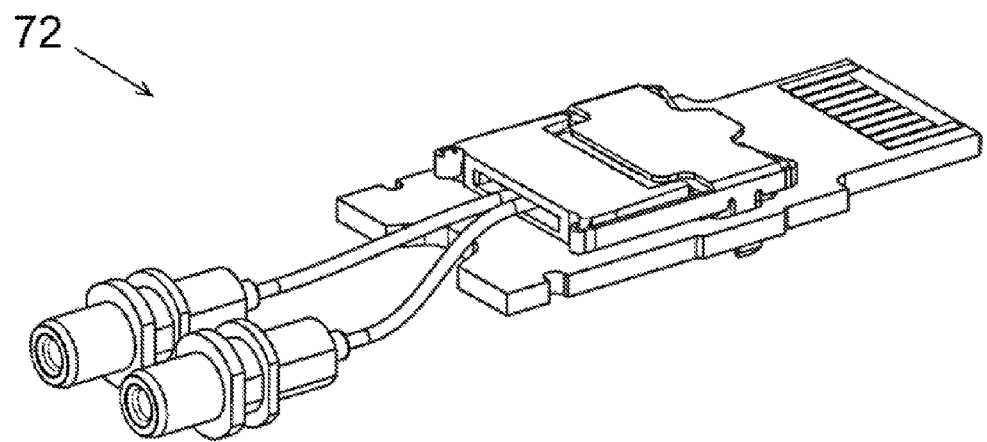
FIG. 27B is a perspective view of the OE assembly depicted in FIG. 27A in a latched position.
Figure 28:
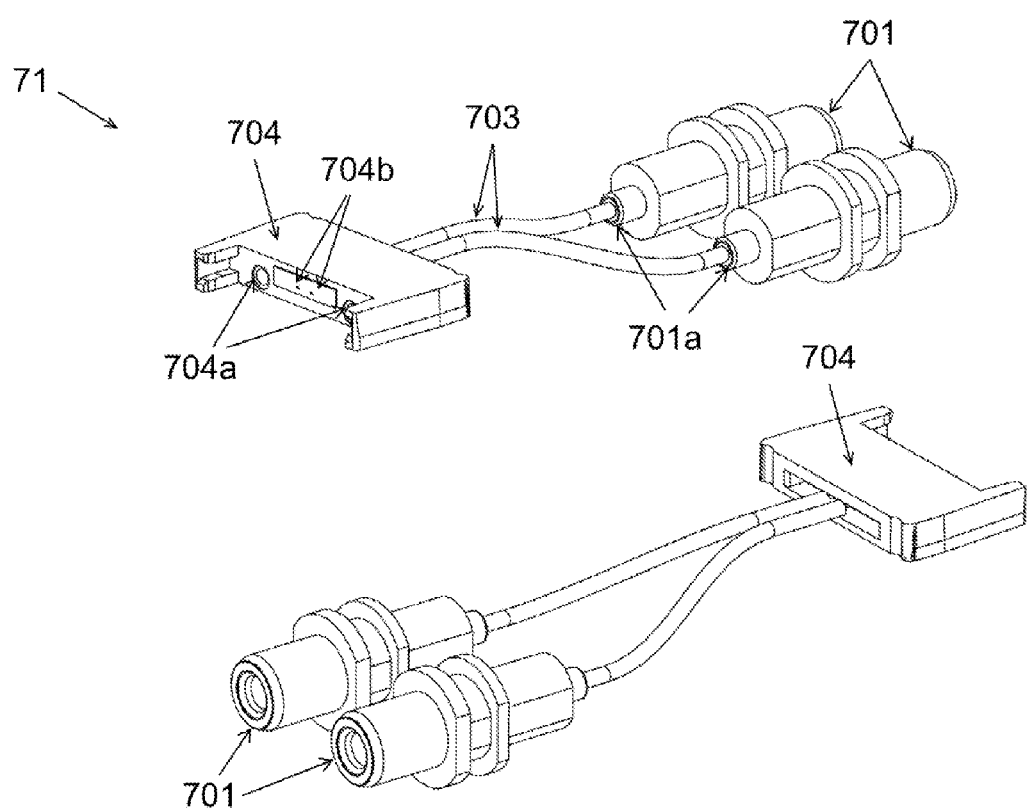
FIG. 28 shows perspective views of the jumper assembly in the OE assembly depicted in FIG. 27A.
Figure 29:
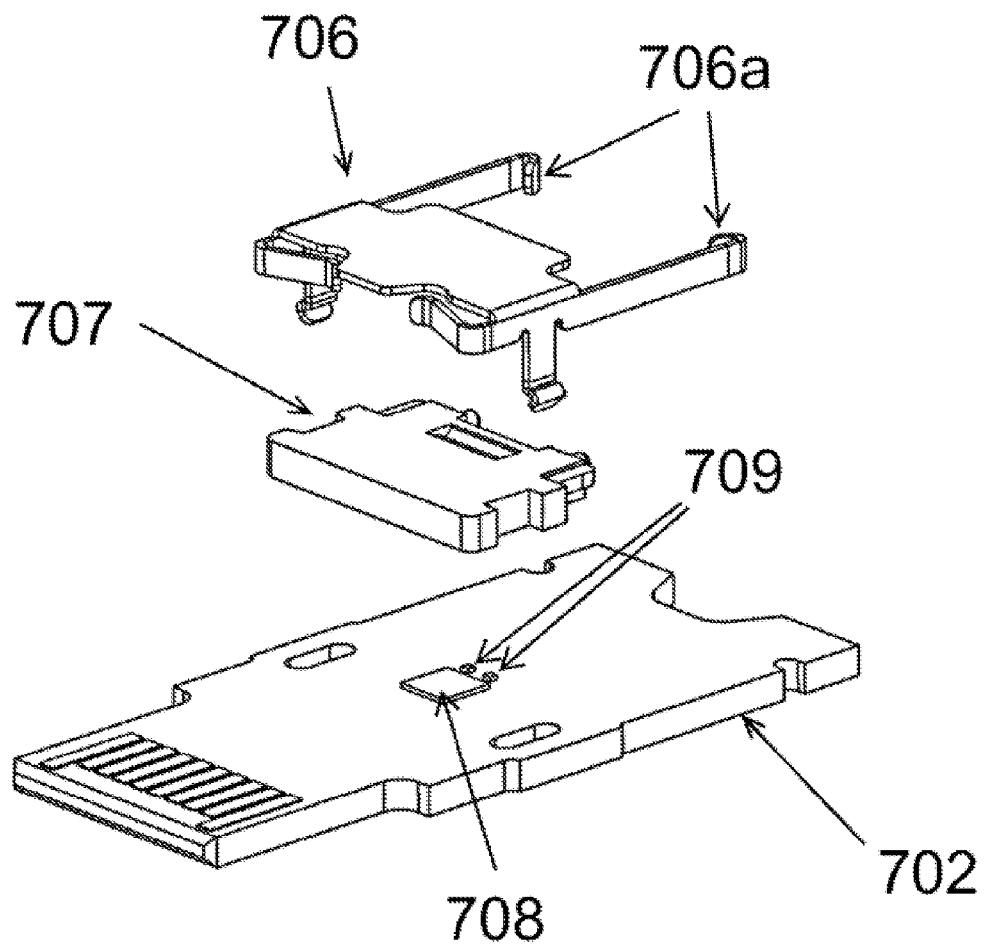
FIG. 29 is an exploded view of the rear lens block and the latching element being assembled onto the PCB in the OE assembly depicted in FIG. 27A.
Figure 30:
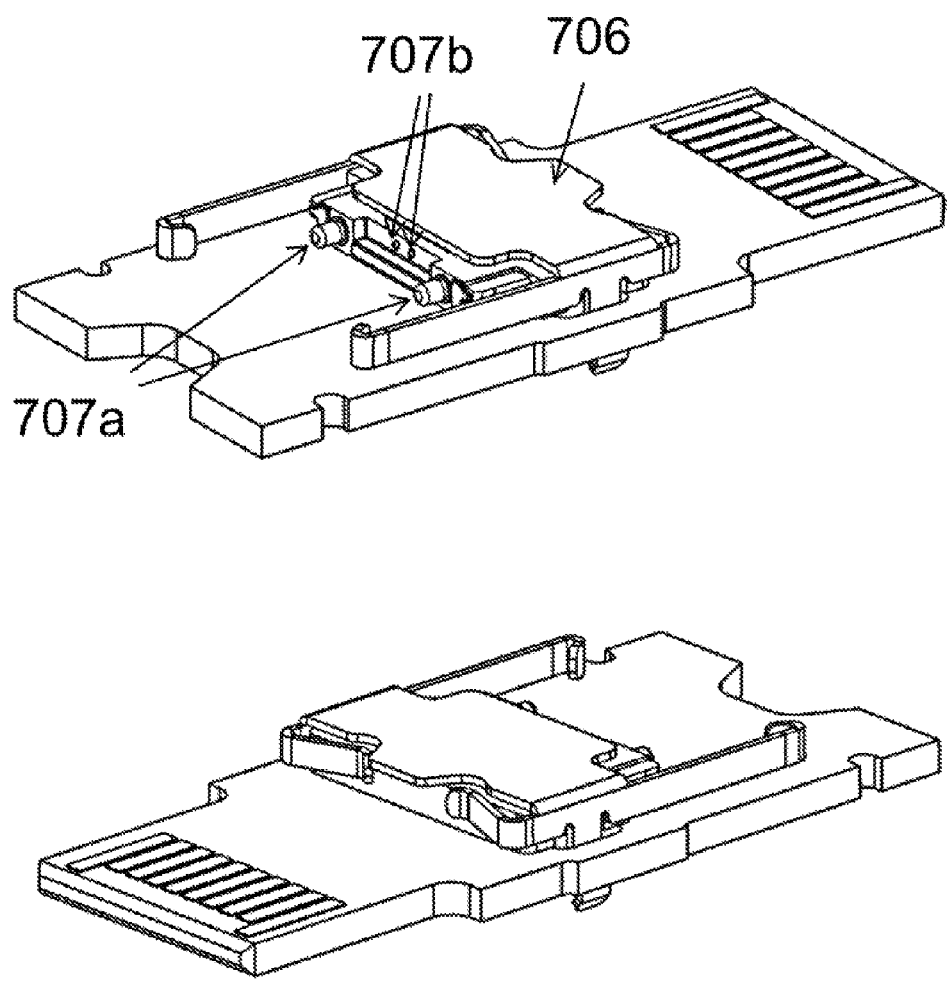
FIG. 30 shows perspective views of the rear lens block and the latching element after being assembled on the PCB in the OE assembly depicted in FIG. 27A.

FIG. 27A is a perspective view of the OE assembly in an un-latched position in a SFP module according to another embodiment of the present patent application. FIG. 27B is a perspective view of the OE assembly depicted in FIG. 27A in a latched position. FIG. 28 shows perspective views of the jumper assembly in the OE assembly depicted in FIG. 27A. FIG. 29 is an exploded view of the rear lens block and the latching element being assembled onto the PCB in the OE assembly depicted in FIG. 27A. FIG. 30 shows perspective views of the rear lens block and the latching element after being assembled on the PCB in the OE assembly depicted in FIG. 27A. The SFP module in this embodiment is also referred to as the Type 7 design. This type is similar to the Type 4 design except that the rear jumper plug 704 is held by a latching element 706 to the rear lens block 707 to prevent disengagement. The latching element 706 is fixed with the substrate. Referring to FIGS. 27A-30, this type of OE engine design includes a detachable fiber jumper assembly 71. The jumper assembly 71 includes front optical ports 71a, jumper fibers 703, and a rear jumper plug 704. The assembly of 703 and 704 forms the light-guiding structure in this embodiment. The jumper plug 704 contains precision alignment features 704a and fiber positioning holes 704b through which the jumper fibers are terminated. Similar to the aforementioned embodiments, the rear lens block 707 covers the lasers/PD chips 709 and the transceiver IC 708 assembled onto the PCB 702. In this embodiment, the jumper plug 704 is detachably engaged with the coupling optical element, and more specifically the lens block 707. Once the jumper plug 704 is engaged with the lens block 707, the latching element 706 with a pair of latching arms 706a is configured to prevent the two parts from disengaging from each other. The latching element 706 can be formed using metal sheets. By doing so, the latching element can provide additional function of EMI shielding and heat spreading to enhance the environmental robustness of the module. In the engaged position, the alignment structures 704a on the jumper plug 704 mate with corresponding alignment structures 707a on the rear lens block 707 to ensure the fibers terminated at the fiber positioning holes 704b are aligned with the lens elements 707b. As a result, a light path similar to that shown in FIG. 12 is formed between the laser/PD chips 709 and the optical fibers 703. It is noted that the coupling optical element in this embodiment includes the latching element 706 and the lens block 707.

The front optical ports 71a (the external pluggable optical interface in this embodiment) of the fiber jumper assembly 71 are formed with a pair of alignment sleeves 701 each having an alignment channel 701c (referring to FIG. 32) at the center. The optical fibers 703 are terminated at the end facet 701d (referring to FIG. 32) of an alignment ferrule 701a through its precision alignment hole 701b (referring to FIG. 33) at the center. The ferrule is then inserted and fixed into the alignment sleeve 701 with the ferrule end facet 701d located within the alignment channel 701c.

Figure 31A:
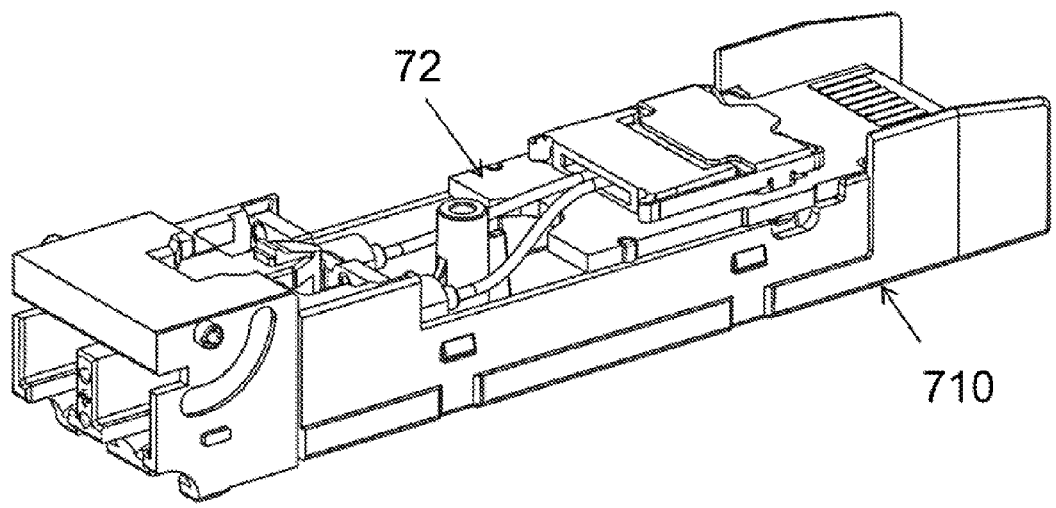
FIG. 31A is a perspective view of the OE assembly located in the transceiver lower housing in the embodiment depicted in FIG. 27A.
Figure 31B:
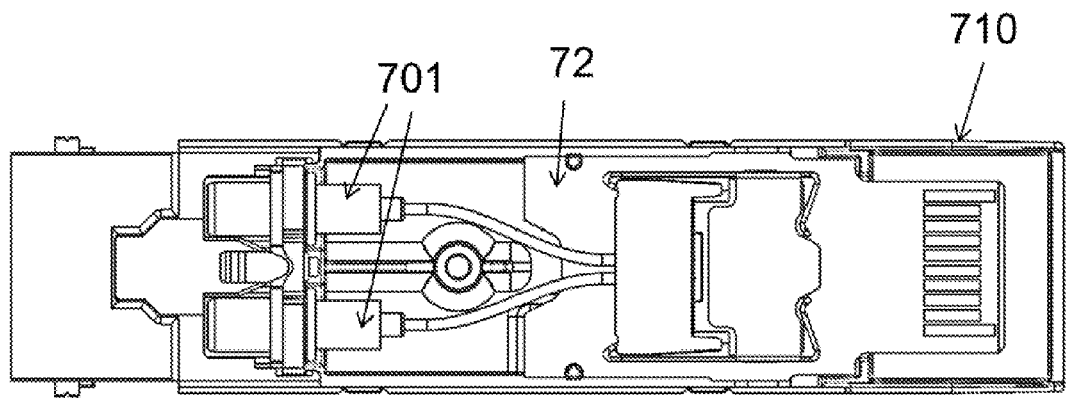
FIG. 31B is a top view of the OE assembly located in the transceiver lower housing in the embodiment depicted in FIG. 27A.
Figure 32:
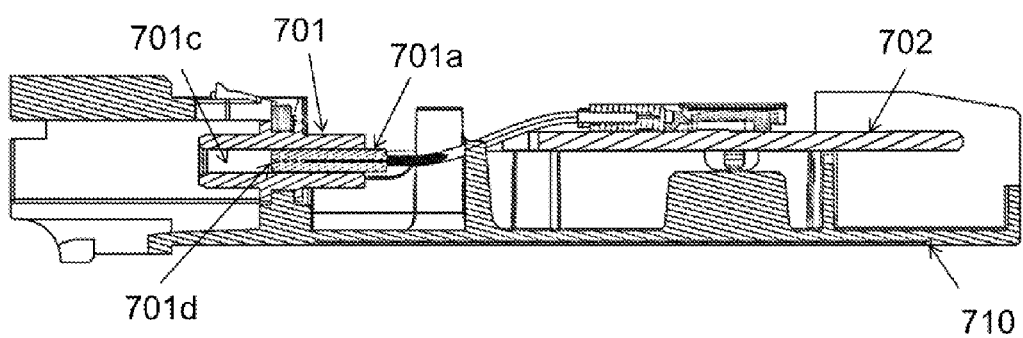
FIG. 32 is a cross-sectional view of OE assembly located in the transceiver lower housing in the embodiment depicted in FIG. 27A.

FIG. 31A is a perspective view of the OE assembly located in the transceiver lower housing in the embodiment depicted in FIG. 27A. FIG. 31B is a top view of the OE assembly located in the transceiver lower housing in the embodiment depicted in FIG. 27A. FIG. 32 is a cross-sectional view of OE assembly located in the transceiver lower housing in the embodiment depicted in FIG. 27A. FIGS. 31A-32 shows the assembled OE assembly 72 located in the lower transceiver housing 710. For clarity of illustration, the top transceiver housing is not shown. The pitch of the two optical ports 701 is maintained by the mechanical structures of the lower transceiver housing and in compliance with SFP/SFP+ MSA standards.

Figure 33:
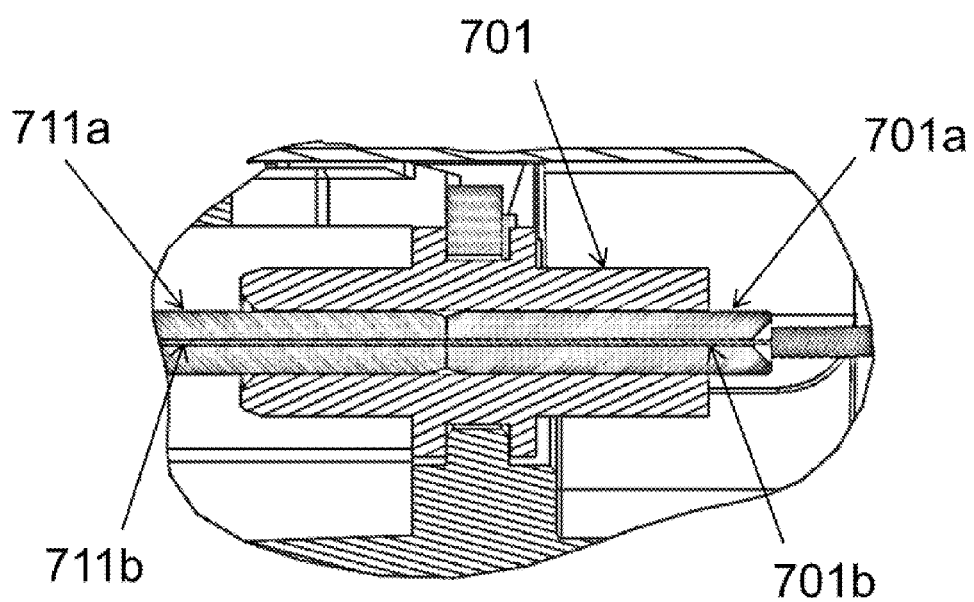
FIG. 33 is a cross-sectional view illustrating the external pluggable interface in the embodiment depicted in FIG. 27A.

FIG. 33 is a cross-sectional view illustrating the external pluggable interface in the embodiment depicted in FIG. 27A. FIG. 33 illustrates the coupling of the optical path between the jumper fiber and an external fiber cable when a compliant external plug is engaged with the transceiver. In this case, the external ferrule 711a inserted into the alignment channel 701c of the alignment sleeve 701 is stopped at the end facet 701d. In this position, the fiber end facet of the external fiber 711b is in close contact and precise alignment with the jumper fiber 703 within the alignment ferrule 701a. Optical signals can thus be directly butt-coupled between the jumper fiber and the external fiber without additional optics and with minimal loss.

In the SFP/SFP+ modules provided by the above embodiments, the laser, photodiodes (PDs), and corresponding drivers and the receiver IC are directly assembled on the PCB. The laser driver and the receiver IC are placed closely to the corresponding optical components. The optical components are aligned precisely with respect to each other. The pitch of the pluggable optical interface is different from the pitch of the optical components. A coupling optical system is employed to guide the transmitting optical signals to the transmitter port and the receiving optical signals from the receiving fiber to the PDs.

In the above embodiments, a pluggable optical transceiver includes a housing with a pluggable optical interface at one end and a pluggable electrical interface at the other end. The pluggable optical interface accommodates at least one transmitting port and one receiving port. The pluggable electrical interface is formed by extending a circuit substrate located inside the housing. At least one optical light source and at least one photodiode (PD) are directly mounted on the substrate. The light source and the PD are placed in close proximity to each other (preferably <1 mm of distance). The pitch of the components is precisely maintained using high-precision bonding techniques. A transmitter driver circuit is placed in close proximity (preferably <1 mm of distance) to and electrically connected to the optical light source. A receiver integrated circuit is located in close proximity (preferably <1 mm of distance) to and electricity connected to the PD. The driver circuit and the receiver circuit can be integrated onto one single chip. A molded optical element with a cavity is bonded onto the substrate. The cavity encloses the light source, the PD and the IC on the substrate. A coupling optical system is formed in conjunction with the molded optical element to couple the transmitted optical signal from the light source to the transmitting port and guide the optical signal received from the receiving port to the PD. It is understood that the above-mentioned coupling optical system may be considered as a part of the above-mentioned optical element. The pitch between the transmitting port and receiving port is different from the pitch of the optical components of the optical system, with the former being larger than the later. The pitch of the transmitting port and the receiving port is in compliance with the SFP/SFP+ MSA standards. The physical dimensions of the transceiver conform to SFP/SFP+ MSA standards.

In the pluggable optical transceivers provided by the above embodiments, the optoelectronic components (the laser and the photodiodes) and the coupling optics are located directly on the PCB board. The laser and the photodiodes are placed in close proximity to each other as well as to the laser driver and receiver IC's. This configuration easily preserves the integrity of the electrical signal transmitted between the optoelectronic components and the IC's. In addition, the alignment process for the coupling optics and the optoelectronic components can be performed in one simple step, eliminating costly active alignment process required for conventional designs. Compared with conventional small-form factor pluggable (SFP) transceivers, the pluggable optical transceivers in the above embodiments have advantages such as a simpler transceiver structure, fewer components required, lower assembly complexity, and lower overall cost.

While the present patent application has been shown and described with particular references to a number of embodiments thereof, it should be noted that various other changes or modifications may be made without departing from the scope of the present invention.

What is claimed is:

1. A pluggable optical transceiver comprising:
    a top housing;
    a bottom housing; and
    an optical-electrical assembly enclosed by the top housing and the bottom housing, the optical-electrical assembly comprising:
        a substrate;
        at least a transmitting optoelectronic component disposed on the substrate;
        at least a receiving optoelectronic component disposed on the substrate;
        interface integrated circuits disposed on the substrate;
        a pluggable electrical interface disposed on the substrate and electrically connected with the interface integrated circuits; and
        a coupling optical system comprising an external pluggable optical interface, a coupling optical element fixedly mounted on the substrate, and a light-guiding structure optically connecting the external pluggable optical interface and the coupling optical element;
    wherein:
    the coupling optical element is configured to couple a first optical signal from the transmitting optoelectronic component to the light-guiding structure, and to couple a second optical signal from the light-guiding structure to the receiving optoelectronic component;
    the light-guiding structure is configured to couple the first optical signal to the external pluggable optical interface, and to couple the second optical signal from the external pluggable optical interface; and
    the external pluggable optical interface is configured to couple the first optical signal to an external transmitting optical fiber, and to couple the second optical signal from a receiving fiber.

2. The pluggable optical transceiver of claim 1, wherein the light-guiding structure comprises a plurality of reflecting surfaces, the external pluggable optical interface comprises a transmitting port and a receiving port, and the reflecting surfaces are configured to couple the first optical signal to the transmitting port, and to couple the second optical signal from the receiving port.

3. The pluggable optical transceiver of claim 2, wherein the transmitting optoelectronic component is a VCSEL, the receiving optoelectronic component is a photodiode, and the transmitting optoelectronic component and the receiving optoelectronic component are mounted on the substrate with a spacing of less than 1 mm.

4. The pluggable optical transceiver of claim 1, wherein the interface integrated circuits comprise a transmitter driver circuit and a receiver circuit, the transmitter driver circuit is electrically connected to and placed in close proximity to the transmitting optoelectronic component by a distance less than 1 mm.

5. The pluggable optical transceiver of claim 4, wherein the receiver circuit is electrically connected to and placed in close proximity to the receiving optoelectronic component by a distance less than 1 mm.

6. The pluggable optical transceiver of claim 4, wherein the transmitter driver circuit and the receiver circuit are integrated onto one single chip.

7. The pluggable optical transceiver of claim 3, wherein the pitch between the transmitting port and the receiving port is larger than the pitch of the VCSEL and the photodiode disposed on the substrate.

8. The pluggable optical transceiver of claim 7, wherein the pitch between the transmitting port and the receiving port is in compliance with the SFP/SFP+ MSA standards.

9. The pluggable optical transceiver of claim 1, wherein the coupling optical element is bonded onto the substrate and defines a cavity that accommodates the transmitting optoelectronic component, the receiving optoelectronic component and the interface integrated circuits.

10. The pluggable optical transceiver of claim 1, wherein the light-guiding structure comprises a pair of jumper fibers optically connecting the external pluggable optical interface and the coupling optical element, the pair of jumper fibers comprising a transmitting jumper fiber and a receiving jumper fiber.

11. The pluggable optical transceiver of claim 10, wherein the jumper fibers are bent by about 90 degrees to directly couple an optical signal from the transmitting optoelectronic component.

12. The pluggable optical transceiver of claim 1, wherein the light-guiding structure comprises a flexible waveguide substrate being optically connected with the external pluggable optical interface.

13. The pluggable optical transceiver of claim 10, wherein the light-guiding structure further comprises a jumper plug configured for mechanically fixing the position of the jumper fibers to match the pitch of the transmitting optoelectronic component and the receiving optoelectronic component, the jumper fibers being terminated at an end facet of the jumper plug.

14. The pluggable optical transceiver of claim 1, wherein the top housing and the bottom housing are made of metal.

15. The pluggable optical transceiver of claim 1 further comprising a top metal shield and a bottom metal shield, wherein the top metal shield and the bottom metal shield enclose the coupling optical element and the substrate, the top housing and the bottom housing being made of a non-conductive moldable material.

16. The pluggable optical transceiver of claim 1, wherein the coupling optical system is formed as one single molded optical element.

17. The pluggable optical transceiver of claim 13, wherein the coupling optical element further comprises a latching element being fixed with the substrate, the jumper plug being detachably engaged with the coupling optical element, the latching element being configured to prevent the jumper plug from disengaging from the coupling optical element.

18. A small form factor pluggable optical transceiver comprising:
a top housing;
a bottom housing; and
an optical-electrical assembly enclosed by the top housing and the bottom housing, the optical-electrical assembly comprising:
a substrate;
at least a transmitting optoelectronic component disposed on the substrate;
at least a receiving optoelectronic component disposed on the substrate;
interface integrated circuits disposed on the substrate;
a pluggable electrical interface disposed on the substrate and electrically connected with the interface integrated circuits; and
a coupling optical system comprising an external pluggable optical interface, a coupling optical element fixedly mounted on the substrate, and a light-guiding structure optically connecting the external pluggable optical interface and the coupling optical element; wherein:
the coupling optical system is configured to couple a first optical signal originated from the transmitting optoelectronic component to the external pluggable optical interface and guide a second optical signal received at the external pluggable optical interface to the receiving optoelectronic component;
the coupling optical element is bonded onto the substrate and defines a cavity that accommodates the transmitting optoelectronic component, the receiving optoelectronic component and the interface integrated circuits; and
the top housing and the bottom housing are made of metal.

19. The small form factor pluggable optical transceiver of claim 18, wherein the light-guiding structure comprises a pair of jumper fibers optically connecting the external pluggable optical interface and the coupling optical element, the pair of jumper fibers comprising a transmitting jumper fiber and a receiving jumper fiber.

20. A pluggable optical transceiver comprising:
a top housing;
a bottom housing; and
an optical-electrical assembly enclosed by the top housing and the bottom housing, the optical-electrical assembly comprising:
a substrate;
at least a transmitting optoelectronic component disposed on the substrate;
at least a receiving optoelectronic component disposed on the substrate;
interface integrated circuits disposed on the substrate;
a pluggable electrical interface disposed on the substrate and electrically connected with the interface integrated circuits; and
a coupling optical system comprising an external pluggable optical interface, a coupling optical element fixedly mounted on the substrate, and a light-guiding structure optically connecting the external pluggable optical interface and the coupling optical element; wherein:
the coupling optical element is configured to couple a first optical signal from the transmitting optoelectronic component to the light-guiding structure, and to couple a second optical signal from the light-guiding structure to the receiving optoelectronic component;

the light-guiding structure is configured to couple the first optical signal to the external pluggable optical interface, and to couple the second optical signal from the external pluggable optical interface;

the external pluggable optical interface is configured to couple the first optical signal to an external transmitting optical fiber, and to couple the second optical signal from a receiving fiber;

the interface integrated circuits comprise a transmitter driver circuit and a receiver circuit;

the transmitter driver circuit is electrically connected to and placed in close proximity to the transmitting optoelectronic component by a distance less than 1 mm;

the receiver circuit is electrically connected to and placed in close proximity to the receiving optoelectronic component by a distance less than 1 mm; and the light-guiding structure comprises a flexible waveguide substrate being optically connected with the external pluggable optical interface.

* * * * *